United States Patent
Zhang et al.

(10) Patent No.: US 11,627,608 B2
(45) Date of Patent: Apr. 11, 2023

(54) INDICATING SYSTEM TIMING INFORMATION IN HIGH BAND COMMUNICATIONS

(71) Applicant: QUALCOMM Incorporated, San Diego, CA (US)

(72) Inventors: Xiaoxia Zhang, San Diego, CA (US); Jing Sun, San Diego, CA (US); Zhifei Fan, San Diego, CA (US); Arumugam Chendamarai Kannan, San Diego, CA (US); Srinivas Yerramalli, Hyderabad (IN); Wooseok Nam, San Diego, CA (US); Tao Luo, San Diego, CA (US); Sungwoo Park, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 17/127,632

(22) Filed: Dec. 18, 2020

(65) Prior Publication Data

US 2021/0204326 A1 Jul. 1, 2021

Related U.S. Application Data

(60) Provisional application No. 62/955,524, filed on Dec. 31, 2019.

(51) Int. Cl.
*H04W 74/08* (2009.01)
*H04W 76/11* (2018.01)
(Continued)

(52) U.S. Cl.
CPC ....... *H04W 74/0833* (2013.01); *H04L 5/0094* (2013.01); *H04W 72/042* (2013.01);
(Continued)

(58) Field of Classification Search
CPC ... H04L 5/0053; H04L 5/0091; H04L 5/0094; H04W 72/042; H04W 72/0446;
(Continued)

(56) References Cited

U.S. PATENT DOCUMENTS

| | | | | |
|---|---|---|---|---|
| 8,644,129 | B2 * | 2/2014 | Dinan | H04L 5/0085 370/206 |
| 10,368,353 | B2 * | 7/2019 | Ly | H04L 27/26025 |

(Continued)

FOREIGN PATENT DOCUMENTS

| | | | | |
|---|---|---|---|---|
| AU | 2018341637 A1 * | 5/2020 | | H04L 5/0007 |
| BR | 112019021512 A2 * | 5/2020 | | H04L 5/00 |

(Continued)

*Primary Examiner* — Eric Nowlin
(74) *Attorney, Agent, or Firm* — Holland & Hart LLP

(57) ABSTRACT

Methods, systems, and devices for wireless communications are described. The method includes receiving a random access configuration for the UE, the random access configuration indicating a subcarrier spacing for random access preambles of a random access procedure and a periodicity of slots including random access channel occasions for transmission of the random access preambles, where the periodicity of the slots is based on the subcarrier spacing for the random access preambles, determining a random access radio network temporary identifier based on the periodicity of the slots and a slot index for a slot in which the UE is to transmit a random access preamble, and transmitting, in the slot, the random access preamble indicating the determined random access radio network temporary identifier.

30 Claims, 25 Drawing Sheets

(51) Int. Cl.
*H04W 72/04* (2009.01)
*H04L 5/00* (2006.01)
*H04W 72/0446* (2023.01)
*H04W 72/0453* (2023.01)

(52) U.S. Cl.
CPC ... *H04W 72/0446* (2013.01); *H04W 72/0453* (2013.01); *H04W 76/11* (2018.02)

(58) Field of Classification Search
CPC .......... H04W 72/0453; H04W 74/006; H04W 74/0833; H04W 76/11
See application file for complete search history.

(56) References Cited

U.S. PATENT DOCUMENTS

| | | | | |
|---|---|---|---|---|
| 10,390,372 | B2 * | 8/2019 | Hong | H04W 74/0841 |
| 10,499,369 | B2 * | 12/2019 | Ryu | H04L 5/0053 |
| 10,531,494 | B2 * | 1/2020 | Maaref | H04L 5/0048 |
| 10,742,387 | B2 * | 8/2020 | Tsuboi | H04W 72/04 |
| 10,791,541 | B2 * | 9/2020 | Hwang | H04L 5/0094 |
| 10,873,976 | B2 * | 12/2020 | Cirik | H04W 76/11 |
| 10,893,543 | B2 * | 1/2021 | Li | H04L 27/2605 |
| 10,925,064 | B2 * | 2/2021 | Liu | H04W 72/048 |
| 10,925,095 | B2 * | 2/2021 | Park | H04W 74/0833 |
| 10,945,290 | B2 * | 3/2021 | Jeon | H04W 74/004 |
| 10,959,208 | B2 * | 3/2021 | Ryu | H04L 27/2692 |
| 11,032,851 | B2 * | 6/2021 | Tsai | H04W 74/0841 |
| 11,076,433 | B2 * | 7/2021 | Kang | H04L 27/26025 |
| 11,166,316 | B2 * | 11/2021 | Ohlsson | H04W 74/0833 |
| 11,191,080 | B2 * | 11/2021 | Agiwal | H04W 72/042 |
| 11,229,055 | B2 * | 1/2022 | Tsai | H04W 1/0026 |
| 11,304,236 | B2 * | 4/2022 | Yan | H04L 5/00 |
| 2016/0227575 | A1 * | 8/2016 | Furuskog | H04W 72/1294 |
| 2017/0223736 | A1 * | 8/2017 | Yi | H04W 74/0858 |
| 2018/0092131 | A1 * | 3/2018 | Hong | H04W 74/0841 |
| 2018/0103476 | A1 * | 4/2018 | Wong | H04W 72/0453 |
| 2018/0124727 | A1 * | 5/2018 | Baldemair | H04W 56/0015 |
| 2018/0206272 | A1 * | 7/2018 | Maaref | H04W 72/042 |
| 2018/0220423 | A1 * | 8/2018 | Ly | H04L 1/0028 |
| 2018/0359784 | A1 * | 12/2018 | Agiwal | H04L 5/0044 |
| 2019/0090284 | A1 * | 3/2019 | Kang | H04W 74/0891 |
| 2019/0104554 | A1 * | 4/2019 | Amuru | H04L 5/0007 |
| 2019/0132882 | A1 * | 5/2019 | Li | H04W 74/0816 |
| 2019/0165905 | A1 * | 5/2019 | Kim | H04W 74/0833 |
| 2019/0166529 | A1 * | 5/2019 | Chen | H04W 36/38 |
| 2019/0223157 | A1 * | 7/2019 | Hwang | H04L 27/26025 |
| 2019/0223224 | A1 * | 7/2019 | Park | H04W 74/006 |
| 2019/0239263 | A1 * | 8/2019 | Jung | H04W 76/10 |
| 2019/0254074 | A1 * | 8/2019 | Jeon | H04W 56/001 |
| 2019/0261423 | A1 * | 8/2019 | Tsai | H04W 24/10 |
| 2019/0261431 | A1 * | 8/2019 | Tsai | H04W 76/11 |
| 2019/0306862 | A1 * | 10/2019 | Ly | H04L 5/0098 |
| 2019/0357261 | A1 * | 11/2019 | Cirik | H04W 24/08 |
| 2019/0364605 | A1 * | 11/2019 | Loehr | H04W 72/10 |
| 2020/0045748 | A1 * | 2/2020 | Yan | H04W 74/0833 |
| 2020/0052867 | A1 * | 2/2020 | Tsuboi | H04L 27/2666 |
| 2020/0100217 | A1 * | 3/2020 | Ryu | H04L 27/2692 |
| 2020/0163076 | A1 * | 5/2020 | Liu | H04W 74/008 |
| 2020/0163124 | A1 * | 5/2020 | Da | H04W 74/0841 |
| 2020/0275489 | A1 * | 8/2020 | Ohlsson | H04W 74/02 |
| 2020/0367288 | A1 * | 11/2020 | Dahlman | H04W 74/0833 |
| 2020/0404712 | A1 * | 12/2020 | Christoffersson | H04W 74/0833 |
| 2021/0100042 | A1 * | 4/2021 | Agiwal | H04W 72/0446 |
| 2021/0259027 | A1 * | 8/2021 | Deogun | H04W 74/0833 |
| 2021/0282189 | A1 * | 9/2021 | Irukulapati | H04L 5/0053 |
| 2021/0329705 | A1 * | 10/2021 | Ljung | H04W 74/0833 |
| 2021/0345425 | A1 * | 11/2021 | Liu | H04W 72/0446 |
| 2022/0295545 | A1 * | 9/2022 | Liu | H04W 74/006 |

FOREIGN PATENT DOCUMENTS

| | | | | |
|---|---|---|---|---|
| CA | 3059806 A1 | * | 10/2018 | ............ H04L 5/00 |
| CN | 108737039 A | * | 11/2018 | ............ H04L 5/00 |
| CN | 110235507 A | * | 9/2019 | ............ H04K 1/02 |
| CN | 110521161 A | * | 11/2019 | ............ H04L 5/00 |
| CN | 111295923 A | * | 6/2020 | ......... H04L 27/2605 |
| CN | 110521161 B | * | 11/2020 | ............ H04L 5/00 |
| CN | 110235507 B | * | 2/2021 | ............ H04K 1/02 |
| EP | 3569030 B1 | * | 8/2021 | ............ H04K 1/02 |
| EP | 3863364 A1 | * | 8/2021 | ......... H04L 5/0005 |
| EP | 3666021 B1 | * | 9/2021 | ......... H04L 27/2605 |
| EP | 3471499 B1 | * | 11/2021 | ......... H04L 5/0005 |
| JP | 2021522753 A | * | 8/2021 | |
| KR | 20200051052 A | * | 5/2020 | |
| KR | 102310822 B1 | * | 10/2021 | |
| WO | WO-2018188652 A1 | * | 10/2018 | ............ H04L 5/00 |
| WO | WO-2019066533 A1 | * | 4/2019 | ......... H04L 5/0007 |
| WO | WO-2019097016 A1 | * | 5/2019 | ......... H04L 5/0053 |
| WO | WO-2019098906 A1 | * | 5/2019 | ........ H04W 74/0833 |
| WO | WO-2019235897 A1 | * | 12/2019 | ............ H04W 24/08 |
| WO | WO-2019088670 A9 | * | 4/2020 | ......... H04L 27/2605 |

* cited by examiner

INDICATING SYSTEM TIMING INFORMATION IN HIGH BAND COMMUNICATIONS

CROSS REFERENCE

The present Application for Patent claims the benefit of U.S. Provisional Patent Application No. 62/955,524 by ZHANG et al., entitled "INDICATING SYSTEM TIMING INFORMATION IN HIGH BAND COMMUNICATIONS," filed Dec. 31, 2019, assigned to the assignee hereof, and expressly incorporated herein.

BACKGROUND

The following relates generally to wireless communications, and more specifically to indicating system timing information in high band communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some examples, a UE may perform random access procedures to establish or reestablish a connection with a base station. In some examples, different subcarrier spacings associated with different numerologies may create challenges for the UE and base station during a random access procedure, for example, resulting in the UE missing a response from a base station, which may cause the UE to lose system timing information.

SUMMARY

The described techniques relate to improved methods, systems, devices, and apparatuses that support indicating system timing information in high band communications. Generally, the described techniques provide for indicating system timing information for a random access message when some subcarrier spacings are applied for random access preambles in some frequency spectrum bands.

A method for wireless communications at a user equipment (UE) is described. The method may include receiving a random access configuration for the UE, the random access configuration indicating resources for the UE to use to transmit a random access preamble and indicating a random access response window, determining a random access radio network temporary identifier based on the indicated resources, transmitting, using the indicated resources, the random access preamble indicating the determined random access radio network temporary identifier, and receiving a downlink control information based on transmitting the random access preamble, the downlink control information indicating a segment of the random access response window corresponding to the random access radio network temporary identifier.

An apparatus for wireless communications at a UE is described. The apparatus may include a processor, memory in electronic communication with the processor, and instructions stored in the memory. The instructions may be executable by the processor to cause the apparatus to receive a random access configuration for the UE, the random access configuration indicating resources for the UE to use to transmit a random access preamble and indicating a random access response window, determine a random access radio network temporary identifier based on the indicated resources, transmit, using the indicated resources, the random access preamble indicating the determined random access radio network temporary identifier, and receive a downlink control information based on transmitting the random access preamble, the downlink control information indicating a segment of the random access response window corresponding to the random access radio network temporary identifier.

Another apparatus for wireless communications at a UE is described. The apparatus may include means for receiving a random access configuration for the UE, the random access configuration indicating resources for the UE to use to transmit a random access preamble and indicating a random access response window, means for determining a random access radio network temporary identifier based on the indicated resources, means for transmitting, using the indicated resources, the random access preamble indicating the determined random access radio network temporary identifier, and means for receiving a downlink control information based on transmitting the random access preamble, the downlink control information indicating a segment of the random access response window corresponding to the random access radio network temporary identifier.

A non-transitory computer-readable medium storing code for wireless communications at a UE is described. The code may include instructions executable by a processor to receive a random access configuration for the UE, the random access configuration indicating resources for the UE to use to transmit a random access preamble and indicating a random access response window, determine a random access radio network temporary identifier based on the indicated resources, transmit, using the indicated resources, the random access preamble indicating the determined random access radio network temporary identifier, and receive a downlink control information based on transmitting the random access preamble, the downlink control information indicating a segment of the random access response window corresponding to the random access radio network temporary identifier.

In some examples of the method, apparatuses, and non-transitory computer-readable medium described herein, the downlink control information indicates X bits that indicate the segment, and X may be a positive integer.

In some examples of the method, apparatuses, and non-transitory computer-readable medium described herein, the random access response window includes at least a 10 millisecond window, and and each segment may be less than 10 milliseconds.

Some examples of the method, apparatuses, and non-transitory computer-readable medium described herein may further include operations, features, means, or instructions for determining, based on a subcarrier spacing for the random access preamble, a quantity of the X bits that indicate the segment.

Some examples of the method, apparatuses, and non-transitory computer-readable medium described herein may further include operations, features, means, or instructions for determining, based on the downlink control information message, resources of the segment for the UE to use to receive a random access response message in the segment and receiving the random access response message on the resources of the segment.

In some examples of the method, apparatuses, and non-transitory computer-readable medium described herein, a duration of the segment may be less than a duration of a system frame.

A method for wireless communications at a base station is described. The method may include configuring a random access configuration to indicate resources for a random access preamble and to indicate a random access response window, broadcasting the random access configuration, receiving a random access preamble, the random access preamble indicating a random access radio network temporary identifier that is based on the random access configuration and on the indicated resources, and transmitting a downlink control information based on receiving the random access preamble, the downlink control information indicating a segment of the random access response window corresponding to the random access radio network temporary identifier.

An apparatus for wireless communications at a base station is described. The apparatus may include a processor, memory in electronic communication with the processor, and instructions stored in the memory. The instructions may be executable by the processor to cause the apparatus to configure a random access configuration to indicate resources for a random access preamble and to indicate a random access response window, broadcast the random access configuration, receive a random access preamble, the random access preamble indicating a random access radio network temporary identifier that is based on the random access configuration and on the indicated resources, and transmit a downlink control information based on receiving the random access preamble, the downlink control information indicating a segment of the random access response window corresponding to the random access radio network temporary identifier.

Another apparatus for wireless communications at a base station is described. The apparatus may include means for configuring a random access configuration to indicate resources for a random access preamble and to indicate a random access response window, means for broadcasting the random access configuration, means for receiving a random access preamble, the random access preamble indicating a random access radio network temporary identifier that is based on the random access configuration and on the indicated resources, and means for transmitting a downlink control information based on receiving the random access preamble, the downlink control information indicating a segment of the random access response window corresponding to the random access radio network temporary identifier.

A non-transitory computer-readable medium storing code for wireless communications at a base station is described. The code may include instructions executable by a processor to configure a random access configuration to indicate resources for a random access preamble and to indicate a random access response window, broadcast the random access configuration, receive a random access preamble, the random access preamble indicating a random access radio network temporary identifier that is based on the random access configuration and on the indicated resources, and transmit a downlink control information based on receiving the random access preamble, the downlink control information indicating a segment of the random access response window corresponding to the random access radio network temporary identifier.

In some examples of the method, apparatuses, and non-transitory computer-readable medium described herein, the downlink control information indicates X bits that indicate the segment, and X may be a positive integer.

In some examples of the method, apparatuses, and non-transitory computer-readable medium described herein, the random access response window includes at least a 10 millisecond window, and and each segment may be less than 10 milliseconds.

In some examples of the method, apparatuses, and non-transitory computer-readable medium described herein, configuring, based on a subcarrier spacing for the random access preamble, a quantity of the X bits to indicate the segment.

Some examples of the method, apparatuses, and non-transitory computer-readable medium described herein may further include operations, features, means, or instructions for configuring the downlink control information to include resources of the segment for the UE to use to receive a random access response message in the segment and transmitting the random access response message on the resources of the segment.

In some examples of the method, apparatuses, and non-transitory computer-readable medium described herein, a duration of the segment may be less than a duration of a system frame.

A method for wireless communications at a UE is described. The method may include receiving a random access configuration for the UE, the random access configuration indicating a subcarrier spacing for random access preambles of a random access procedure and time-frequency resources including random access channel occasions for transmission of the random access preambles, where the time-frequency resources are based on the subcarrier spacing for the random access preambles, determining a random access radio network temporary identifier based on the time-frequency resources and a slot index for a slot in which the UE is to transmit a random access preamble, and transmitting, in the slot, the random access preamble indicating the determined random access radio network temporary identifier.

An apparatus for wireless communications at a UE is described. The apparatus may include a processor, memory in electronic communication with the processor, and instructions stored in the memory. The instructions may be executable by the processor to cause the apparatus to receive a random access configuration for the UE, the random access configuration indicating a subcarrier spacing for random access preambles of a random access procedure and time-frequency resources including random access channel occasions for transmission of the random access preambles, where the time-frequency resources are based on the subcarrier spacing for the random access preambles, determine a random access radio network temporary identifier based on the time-frequency resources and a slot index for a slot in which the UE is to transmit a random access preamble, and transmit, in the slot, the random access preamble indicating the determined random access radio network temporary identifier.

Another apparatus for wireless communications at a UE is described. The apparatus may include means for receiving a random access configuration for the UE, the random access configuration indicating a subcarrier spacing for random access preambles of a random access procedure and time-frequency resources including random access channel occasions for transmission of the random access preambles, where the time-frequency resources are based on the subcarrier spacing for the random access preambles, means for determining a random access radio network temporary identifier based on the time-frequency resources and a slot index for a slot in which the UE is to transmit a random access preamble, and means for transmitting, in the slot, the random access preamble indicating the determined random access radio network temporary identifier.

A non-transitory computer-readable medium storing code for wireless communications at a UE is described. The code may include instructions executable by a processor to receive a random access configuration for the UE, the random access configuration indicating a subcarrier spacing for random access preambles of a random access procedure and time-frequency resources including random access channel occasions for transmission of the random access preambles, where the time-frequency resources are based on the subcarrier spacing for the random access preambles, determine a random access radio network temporary identifier based on the time-frequency resources and a slot index for a slot in which the UE is to transmit a random access preamble, and transmit, in the slot, the random access preamble indicating the determined random access radio network temporary identifier.

In some examples of the method, apparatuses, and non-transitory computer-readable medium described herein, a periodicity of slots including the random access channel occasions, where determining the random access radio network temporary identifier may be based on the periodicity of slots and the slot index.

In some examples of the method, apparatuses, and non-transitory computer-readable medium described herein, a periodicity of slots including the random access channel occasions may be based on the random access channel occasions being allocated every N slots for the subcarrier spacing, and N may be a positive integer greater than 1.

In some examples of the method, apparatuses, and non-transitory computer-readable medium described herein, the subcarrier spacing includes a N*120 kilohertz subcarrier spacing, and, a range of the slot index of the random access radio network temporary identifier ranges from zero to a value determined based on a floor operation, and the floor operation performed on a ratio of the slot index to N.

In some examples of the method, apparatuses, and non-transitory computer-readable medium described herein, a time resource for transmission of a random access preamble in the random access channel occasions, where determining the random access radio network temporary identifier may be based on the time resource and performing a modulo operation that may be based on the indicated subcarrier spacing for the random access preambles.

Some examples of the method, apparatuses, and non-transitory computer-readable medium described herein may further include operations, features, means, or instructions for determining that the random access radio network temporary identifier collides with a previously determined random access radio network temporary identifier, or collides with a reserved value from a reserved range of values, or collides with a pre-allocated random access radio network temporary identifier and marking the random access radio network temporary identifier as invalid based on the determining.

In some examples of the method, apparatuses, and non-transitory computer-readable medium described herein, the pre-allocated random access radio network temporary identifier includes a paging random access radio network temporary identifier or a system information random access radio network temporary identifier.

In some examples of the method, apparatuses, and non-transitory computer-readable medium described herein, a slot index ranges from zero to N*80 for a subcarrier spacing of N*120 kilohertz and a random access response window may be M milliseconds, and N may be a positive integer greater than 1 and M may be a positive integer that ranges from 1 to 40.

In some examples of the method, apparatuses, and non-transitory computer-readable medium described herein, at least one of a periodicity of slots including the random access channel occasions for transmission for the random access preambles or a limit of frequency domain random access channel occasions, where determining the random access radio network temporary identifier may be based on the at least one of the periodicity of slots or the limit of frequency domain random access channel occasions and where a number of frequency domain random access channel occasions may be 1 or 2 when the subcarrier spacing may be 960 kilohertz and an uplink carrier identifier may be set to 1, or where a number of frequency domain random access channel occasions may be between zero and 4 when the subcarrier spacing may be 960 kilohertz and an uplink carrier identifier may be set to 1, or the uplink carrier identifier may be set to zero and a periodicity of slots including the random access channel occasions may be set to every other slot.

In some examples of the method, apparatuses, and non-transitory computer-readable medium described herein, the random access configuration indicates an extension of the slot index based on the subcarrier spacing for the random access preambles.

In some examples of the method, apparatuses, and non-transitory computer-readable medium described herein, a number of frequency domain random access channel occasions may be between zero and 4, and a number of time domain random access channel occasions by allocating the random access channel occasions every other slot when the number of frequency domain random access channel occasions may be between zero and 4, and and a slot index ranges from zero to 320 when the number of frequency domain random access channel occasions may be between zero and 4 and an uplink carrier identifier may be set to zero.

In some examples of the method, apparatuses, and non-transitory computer-readable medium described herein, a number of frequency domain random access channel occasions may be between zero and 4 when an uplink carrier identifier may be set to zero, a slot index ranges from zero to 640 when the number of frequency domain random access channel occasions may be limited between zero and 4 and the uplink carrier identifier may be set to zero, and, and the number of frequency domain random access channel occasions may be between zero and 4 when the subcarrier spacing may be 960 kilohertz and the uplink carrier identifier may be set to zero.

A method for wireless communications at a base station is described. The method may include configuring a random access configuration for the UE, the random access configuration indicating a subcarrier spacing for random access preambles of a random access procedure and time-frequency resources including random access channel occasions for transmission of the random access preambles, where the time-frequency resources are based on the subcarrier spacing for the random access preambles, broadcasting the random access configuration, and receiving a random access preamble, the random access preamble indicating a random access radio network temporary identifier that is based on the time-frequency resources and a slot index for a slot in which the random access preamble is received.

An apparatus for wireless communications at a base station is described. The apparatus may include a processor, memory in electronic communication with the processor, and instructions stored in the memory. The instructions may be executable by the processor to cause the apparatus to configure a random access configuration for the UE, the random access configuration indicating a subcarrier spacing for random access preambles of a random access procedure and time-frequency resources including random access channel occasions for transmission of the random access preambles, where the time-frequency resources are based on the subcarrier spacing for the random access preambles, broadcast the random access configuration, and receive a random access preamble, the random access preamble indicating a random access radio network temporary identifier that is based on the time-frequency resources and a slot index for a slot in which the random access preamble is received.

Another apparatus for wireless communications at a base station is described. The apparatus may include means for configuring a random access configuration for the UE, the random access configuration indicating a subcarrier spacing for random access preambles of a random access procedure and time-frequency resources including random access channel occasions for transmission of the random access preambles, where the time-frequency resources are based on the subcarrier spacing for the random access preambles, means for broadcasting the random access configuration, and means for receiving a random access preamble, the random access preamble indicating a random access radio network temporary identifier that is based on the time-frequency resources and a slot index for a slot in which the random access preamble is received.

A non-transitory computer-readable medium storing code for wireless communications at a base station is described. The code may include instructions executable by a processor to configure a random access configuration for the UE, the random access configuration indicating a subcarrier spacing for random access preambles of a random access procedure and time-frequency resources including random access channel occasions for transmission of the random access preambles, where the time-frequency resources are based on the subcarrier spacing for the random access preambles, broadcast the random access configuration, and receive a random access preamble, the random access preamble indicating a random access radio network temporary identifier that is based on the time-frequency resources and a slot index for a slot in which the random access preamble is received.

In some examples of the method, apparatuses, and non-transitory computer-readable medium described herein, a periodicity of slots including the random access channel occasions, where determining the random access radio network temporary identifier may be based on the periodicity of slots and the slot index.

In some examples of the method, apparatuses, and non-transitory computer-readable medium described herein, a periodicity of slots including the random access channel occasions may be based on the random access channel occasions being allocated every N slots for the subcarrier spacing, N may be a positive integer greater than 1, and, the subcarrier spacing includes a N*120 kilohertz subcarrier spacing, and, a range of the slot index of the random access radio network temporary identifier ranges from zero to a value determined based on a floor operation, and the floor operation performed on a ratio of the slot index to N.

Some examples of the method, apparatuses, and non-transitory computer-readable medium described herein may further include operations, features, means, or instructions for configuring the random access configuration to indicate a normal uplink carrier and a supplementary uplink carrier, where the random access configuration may be broadcasted on the normal uplink carrier or the supplementary uplink carrier, or both and where the random access preamble may be received on the normal uplink carrier or the supplementary uplink carrier, where the random access radio network temporary identifier may be based on the normal uplink carrier or the supplementary uplink carrier.

Some examples of the method, apparatuses, and non-transitory computer-readable medium described herein may further include operations, features, means, or instructions for configuring the random access configuration to indicate a predetermined value used to shift bit values for the random access radio network temporary identifier to follow a set of one or more additional radio network temporary identifiers different from the random access radio network temporary identifier and where the random access radio network temporary identifier may be based on the random access configuration, the predetermined value being added, and a slot index for a slot in which the random access preamble may be received.

Some examples of the method, apparatuses, and non-transitory computer-readable medium described herein may further include operations, features, means, or instructions for configuring the random access configuration to indicate resources for a random access preamble and where the random access radio network temporary identifier may be based on the random access configuration and an ordinal number associated with a random access channel occasion of a random access response window corresponding to the indicated resources.

DETAILED DESCRIPTION

Figure 1:
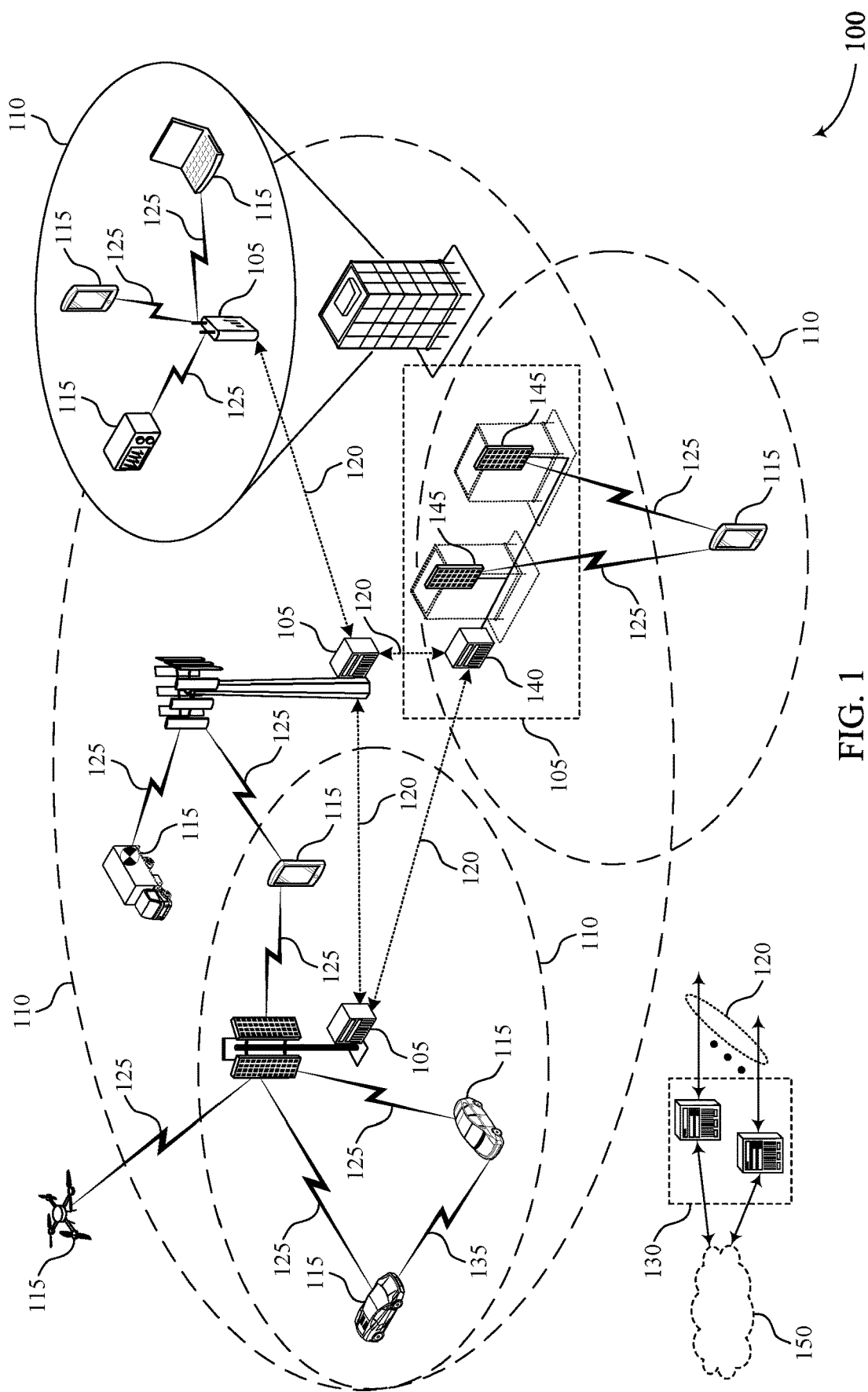
FIG. 1 illustrates an example of a system for wireless communications that supports indicating system timing information in high band communications in accordance with aspects of the present disclosure.

In a high frequency spectrum band (e.g., millimeter wave band, or above 24 GHz), relatively large subcarrier spacing (SCS) may be used to support larger bandwidth and to more effectively deal with phase noise. A relatively large SCS for the physical random access channel (PRACH) may be used to allow for simplified receiver processing with aligned SCS between PRACH and other uplink channels. In some systems, the random access response (RAR) window may vary from 10 ms to 40 ms. In some systems, the RAR window may vary from 10 ms to 40 ms, but may be no lower than 10 ms. However, when relatively large SCS is used for PRACH (e.g., 960 kHz SCS, 1.92 MHz, 3.84 MHz, etc.), the 10 ms random access radio network temporary identifier (RA-RNTI) formula results in a RAR window of 1.25 ms when using a 960 kHz SCS for PRACH preamble in a high frequency spectrum band. However, a 1.25 ms RAR window may be too short for a UE to capture RAR from a base station. The RAR becomes even shorter with higher SCS for PRACH preamble (e.g., 1.92 MHz SCS, 3.84 MHz SCS, etc.). Techniques described herein may provide ways to indicate system timing information for random access messages when a relatively large SCS is applied for a random access preamble in a relatively high frequency spectrum band. For example, techniques are proposed for indicating system timing information for random access messages (e.g., message 2 of a 4-step random access procedure or message B of a 2-step random access procedure) when relatively large SCS is applied for PRACH preamble in high frequency spectrum bands.

In some examples, the present techniques may use a legacy RA-RNTI formula, but restrict the number of slots used for PRACH transmission. In some examples, only one slot out of every N slots may be used for RACH occasions, where N is a positive integer. In one example, one out of eight slots may be used for RACH occasion configurations with a 960 kHz SCS for PRACH. For example, because at 960 kHz the RAR window is 1.25 ms, one out of every eight slots can be used for RACH occasions, then the 1.25 ms effectively makes a 10 ms RAR window from eight 1.25 ms RAR windows.

In some examples, the present techniques may extend the RA-RNTI formula. In some examples, some or all of the timing information related to RACH occasions may be contained in RA-RNTI. In one example, the range of the time domain RACH occasions (e.g., t_id) may be extended to a range from 0 to 640 ($0 \leq t\_id < 640$) for a 10 ms RAR window and 960 kHz SCS for PRACH preamble. In addition, the RA-RNTI may end up being more than hexadecimal FFFF, and thus a modular operation may be applied to the RA-RNTI formula to determine a value for RA-RNTI. Due to the modular operation, some RACH occasions may have the same RA-RNTI and thus the determined RA-RNTI may collide with FFF0-FFFD (reserved) or Paging RNTI (FFFE) or System Information RNTI (FFFF). When the determined RA-RNTI collides with a reserved RNTI, a previous RNTI, or predetermined RNTI, the determined RA-RNTI may be marked as invalid and ignored.

In some examples, the present techniques may limit time domain RACH occasions and/or frequency domain RACH occasions in a high frequency spectrum band. In one example, the number of frequency domain RACH occasions are limited to 2 for RA-RNTI with 960 KHs SCS. In another example, both time and frequency domain RACH occasions are limited (e.g., time RACH occasions may be allocated every other slot and up to 4 frequency domain RACH occasions may be allowed). In another example, normal uplink (NUL; e.g., ul_id=0) is allowed for a high frequency spectrum band, but supplementary uplink (SUL; e.g., ul_id=1) is not allowed for a high frequency spectrum band, where the number of frequency domain RACH occasions are limited to four for RA-RNTI with 960 kHz SCS.

In some examples, the present techniques may use separate RA-RNTIs for NUL and SUL RACH occasions, for example rather than treating them equally as in other systems (e.g., legacy systems). In some examples, NUL may be used in a high frequency spectrum band when a relatively large SCS (e.g., 960 kHz SCS) is used for RACH preamble, and SUL may be used in a low frequency spectrum band when a smaller SCS (e.g., 30 kHz SCS) is used for RACH preamble.

In some examples, the present techniques may allow a value of the RA-RNTI identifier to go above a 16 bit value by adding $2^{16}$ to the RA-RNTI formula (e.g., RA-RNTI starts after hexadecimal FFFF).

In some examples, the present techniques may use the RACH occasions numbering within the RAR window as the value of RA-RNTI. For example, with a 10 ms RAR window, the first RACH occasions in the 10 ms RAR uses RA-RNTI=1, the second RACH occasions in the 10 ms RAR uses RA-RNTI=2, and so on. The RACH occasions can be numbered in the ascending order of frequency, time and UL carrier within each of the 10 ms RAR windows.

In some examples, the present techniques may use the legacy RA-RNTI formula, while conveying additional sub system frame number (sub-SFN) system timing information in downlink control information (DCI) to schedule random access messages. As explained herein, a higher frequency SCS (e.g., 960 kHz SCS, 1.92 MHz SCS, 3.84 MHz SCS, etc.) may result in RAR windows dropping below the 10 ms radio frame length. Using the examples of the 960 kHz PRACH SCS and 10 ms RAR window, the DCI may indicate the sub-SFN system timing information in 3 bits. The number of bits in the DCI may increase with an increase in the SCS (e.g., indicate 1 in 16 system frame number (SFN) segments in 4 bits for 1.92 MHz PRACH SCS, etc.). The DCI, which may be used to schedule a random access message (e.g., message 2 in a 4-step random access procedure, or message B in a 2-step random access procedure), may be configured to indicate within the 10 ms RAR window whether the RACH occasions correspond to which of N segments in the RAR window corresponds to the RACH occasions.

In some examples, the present techniques may be applied for SCS in a high band, though the present techniques may be broadly applicable in any radio frequency spectrum band. As used herein, a high band may refer to a relatively high radio frequency spectrum band, for example, a millimeter wave spectrum or a radio frequency spectrum band above 6 GHz, or between 30 GHz and 300 GHz, or between 24 GHz and 71 GHz, etc., or in Frequency Range 2 (FR2), as opposed to a relatively low radio frequency spectrum band, for example, a radio frequency spectrum band below 6 GHz (e.g., a sub-6 band), or between about 900 MHz and 30 GHz, or below 24, etc., or in Frequency Range 1 (FR1) (about 450 MHz to 6 GHz).

Particular implementations of the subject matter described herein can be implemented to realize one or more potential advantages. In some implementations, the described techniques may improve efficiency and effectiveness of random access procedures, and decrease latency for UEs to access a base station of a wireless communications system, for example by reducing a number of missed random access responses by the UE, while allowing the UE to support a larger bandwidth and more effectively handle larger phase noise associated. The described techniques may thus reduce latency of communication and may also decrease power consumption at the UE. In some cases, a UE processor may more efficiently and effectively operate using the described techniques by reducing an amount of processing, reducing processing throughput and power consumption, and more quickly accessing a communication system. The overall wireless communication system may have reduced communications overhead, for example by a reduction in the overall number of messages communicated on the medium (e.g., transmitted by a UE and/or based station) during random access procedures.

Aspects of the disclosure are initially described in the context of a wireless communications system. Aspects of the disclosure are further illustrated by and described with reference to a timeline and flow diagram. Aspects of the disclosure are further illustrated by and described with reference to apparatus diagrams, system diagrams, and flowcharts that relate to indicating system timing information in high band communications.

FIG. 1 illustrates an example of a wireless communications system 100 that supports early indication of new radio-light dedicated system information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the media access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 may generate a random access configuration. In some examples, the base station 105 may send the random access configuration to a UE 115. In some examples, the UE 115 may determine a RA-RNTI based at least in part on the random access configuration. In some examples, the UE 115 may generate a random access preamble based at least in part on the RA-RNTI. In some examples, the UE 115 may transmit the random access preamble to the base station 105. In some cases, the random access preamble may indicate the radio network temporary identifier.

Figure 2:
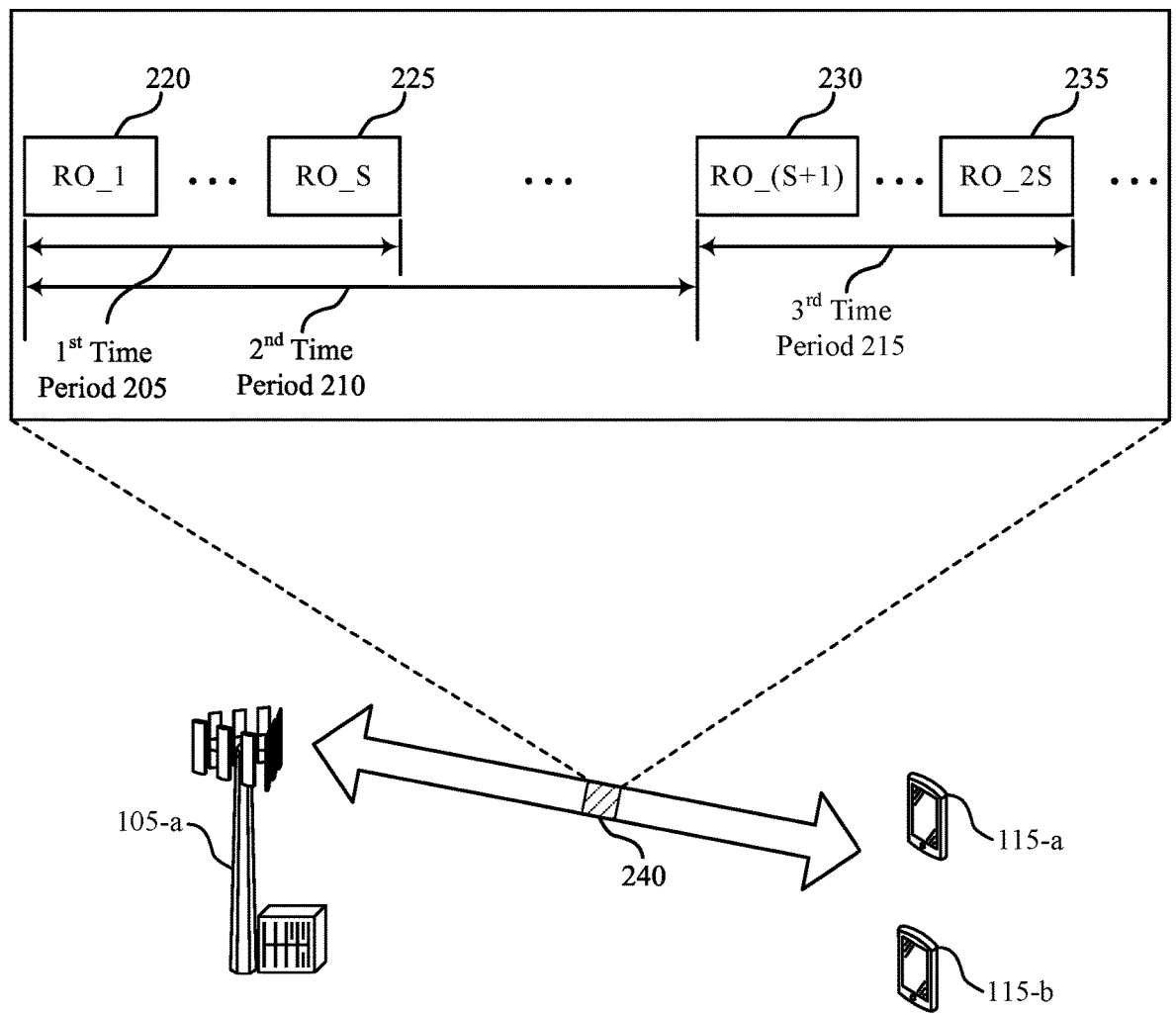
FIG. 2 illustrates an example of a timeline that supports indicating system timing information in high band communications in accordance with aspects of the present disclosure.

FIG. 2 illustrates an example of a timeline 240 in a wireless communications system 200 that supports indicating system timing information in high band communications in accordance with aspects of the present disclosure. Wireless communications system 200 may include base station 105-a and UEs 115-a and 115-b, which may be examples of base station 105 and UE 115, respectively, as described with reference to FIG. 1. In some examples, timeline 240 may implement aspects of wireless communications system 100. The timeline 240 may include a first time period 205, a second time period 210, and a third time period 215.

As illustrated, timeline 240 may include a first random access channel (RACH) occasion 220 of a first set of RACH occasions and a Sth RACH occasion 225 of the first set of RACH occasions. In some examples, the first set of RACH occasions may include S RACH occasions.

In some examples, a UE (e.g., UE 115 of FIG. 1) may perform a random access procedure. In some examples, the UE performing the random access procedure may include the UE receiving a random access configuration (e.g., from a base station 105 of FIG. 1). In some examples, the random access configuration may indicate a subcarrier spacing (SCS) for random access preambles of a random access procedure. In some examples, the random access configuration may indicate a periodicity of slots comprising RACH occasions for transmission of the random access preambles. In some examples, the periodicity of the slots may be based at least in part on the SCS for the random access preambles. In some examples, one slot may be defined as a time period that includes 14 orthogonal frequency-division multiplexing (OFDM) symbols (e.g., for normal cyclic prefix) or 12 OFDM symbols (e.g., for extended cyclic prefix).

In some examples, the random access configuration may indicate how many RACH occasions are allocated in frequency domain and/or how many RACH occasions are allocated in time domain. In some examples, the value S of the S RACH occasions of FIG. 1 may be determined based on the information from the random access configuration. As illustrated, timeline 240 may include an (S+1)th RACH occasion 230 of a second set of RACH occasions and a (2*S)th RACH occasion 235 of the second set of RACH occasions. In some examples, the second set of RACH occasions may include S RACH occasions.

In some examples, a UE may determine a RA-RNTI as part of a random access procedure. In some cases, the UE may determine the RA-RNTI based at least in part on the following equation:

$$\text{RA-RNTI} = 1 + s\_id + 14 \times t\_id + 14 \times 80 \times f\_id + 14 \times 80 \times 8 \times ul\_id \quad \text{(Eq. 1)}$$

where s_id is the index of the first OFDM symbol of the PRACH occasion (0≤s_id<14), t_id is the index of the first slot of the PRACH occasion in a system frame (0≤t_id<80), fid is the index of the PRACH occasion in the frequency domain (0≤fid<8), and ul_id is an identifier of the uplink carrier used for random access preamble transmission, where ul_id is zero for the normal uplink (NUL) carrier, and 1 for the supplementary uplink (SUL) carrier.

As previously indicated, the random access configuration may indicate a periodicity of slots comprising RACH occasions for transmission of the random access preambles. In some examples, a UE may determine a RA-RNTI based at least in part on the periodicity of the slots and a slot index for a slot in which the UE is to transmit a random access preamble. In some examples, the time domain RACH occasion may be limited where t_id does not exceed 80. In some cases, the limitation on the time domain RACH occasions may be indicated in the random access configuration. In some cases, the total number of slots which may be used for random access transmission may be limited to 80 regardless of the configuration of the random access SCS. In some examples, the periodicity of the slots may indicate that RACH occasions may be allocated every N slots (e.g., N=8 slots for 960 kHz SCS, N=16 slots for 1.92 MHz SCS, N=32 for 3.84 MHz SCS, etc.). In some examples, t_id from the RA-RNTI equation counts in the unit of the N slots, e.g., t_id=floor(slot_index/N). Thus, in some examples, the periodicity of the slots may indicate that one slot out of every N slots may include RACH occasions or one slot out of every N slots may be used for RACH occasion configurations. In some examples, the periodicity of the slots from the random access configuration may indicate the value of N. In some examples, the random access configuration may indicate the subcarrier spacing and not the value of N, where the UE may be configured to determine the value of N from the subcarrier spacing indicated in the random access configuration (e.g., if subcarrier spacing of 960 kHz indicated, then N=8, etc.).

In the illustrated example, first time period 205 may represent a slot and second time period 210 may represent a first set of N slots. Thus, as shown, first time period 205 may include a first set of S RACH occasions, and third time period 215 from a second set of N slots may include a second set of S RACH occasions, and so on. In some cases, a UE may determine a RA-RNTI based at least in part on the periodicity of the slots and a slot index for a slot in which the UE is to transmit a random access preamble. In some cases, the UE may transmit, in the slot, the random access preamble indicating the determined RA-RNTI.

Figure 3:
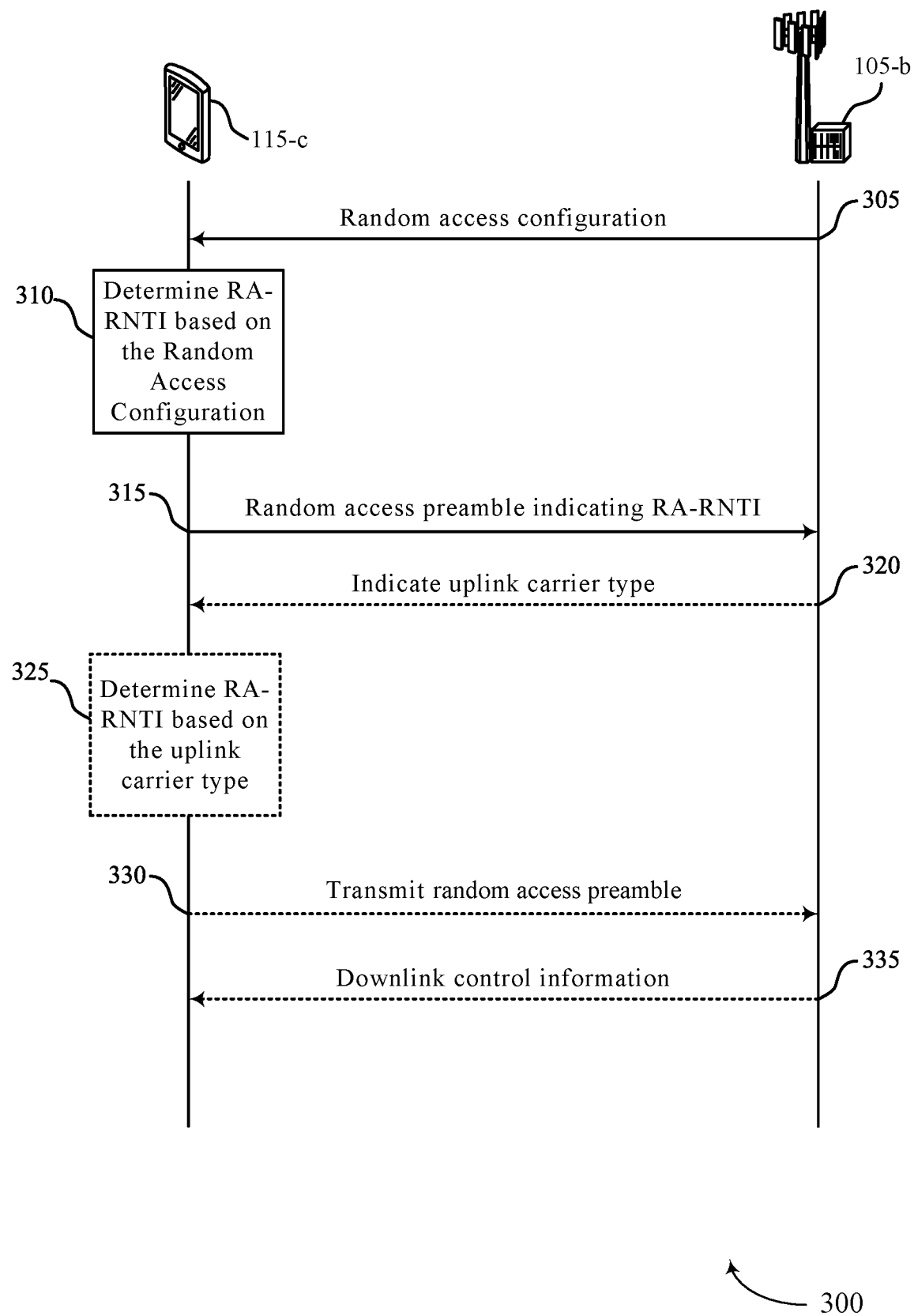
FIG. 3 illustrates an example of a flow diagram that supports indicating system timing information in high band communications in accordance with aspects of the present disclosure.

FIG. 3 illustrates an example of a flow diagram 300 that supports indicating system timing information in high band communications in accordance with aspects of the present disclosure. In some examples, flow diagram 300 may implement aspects of wireless communications systems 100 and/or 200. In some examples, flow diagram 300 may include UE 115-*c* and base station 105-*b*. UE 115-*c* may be an example of a UE from FIG. 1. Base station 105-*b* may be an example of a base station of FIG. 1. In some cases, base station 105-*b* may provide access to a cellular network (e.g., a network operating in accordance with one or more releases and/or version of a 3GPP standard for cellular communications).

At 305, base station 105-*b* may transmit random access configuration. At 310, UE 115-*c* may determine a RA-RNTI based at least in part on the random access configuration.

In the illustrated example, UE 115-*c* may receive the random access configuration transmitted by base station 105-*b*. In some examples, the random access configuration may indicate a subcarrier spacing (SCS) for random access preambles of a random access procedure. In some examples, the random access configuration may indicate a periodicity of slots comprising random access channel occasions for transmission of the random access preambles (e.g., random access channel occasions every eight slots, etc.). In some examples, the periodicity of the slots may be based at least in part on the SCS for the random access preambles. In some examples, UE 115-*c* may determine a RA-RNTI based at least in part on the periodicity of the slots and a slot index for a slot in which UE 115-*c* is to transmit a random access preamble (e.g., at 330).

In some examples, the random access configuration may indicate a SCS for random access preambles of a random access procedure and a time resource for transmission of a random access preamble. In some examples, UE 115-*c* may determine a RA-RNTI based at least in part on a slot index associated with the time resource and performing a modulo operation that is based at least in part on the indicated SCS for the random access preambles.

In some examples, the RA-RNTI (RA-RNTI) formula may be extended to a different band (e.g., relatively high frequency band). In some examples, all of the timing information related to RACH occasions may be included in the formula for RA-RNTI. In some examples, due to relatively large SCS (e.g., 960 kHz SCS, 1.92 MHz SCS, 3.84 MHz SCS, etc.), the time domain RACH occasion t_id may be extended to cover more RACH occasions within a random access response (RAR) window. For example, with a 10 ms RAR window and 960 kHz SCS for PRACH preamble, t_id may range from 0 to 640 (instead of from 0 to 80). As a result, the determined value of RA-RNTI may be a value beyond hexadecimal FFFF (e.g., 2^16, or decimal 65,536), and so a modulo operation may be performed in relation to determining RA-RNTI (e.g., mod(2^16)) to ensure that when the value for RA-RNTI is beyond FFFF, the determined value is converted back below FFFF by the modulo operation. Accordingly, the RA-RNTI formula may be modified by extending t_id to 640 (e.g., from 0 to 640 instead of from 0 to 80) as well as performing a modulo operation as follows:

$$RA\text{-}RNTI = 1 + [s\_id + 14 \times t\_id + 14 \times 640 \times f\_id + 14 \times 640 \times 8 \times ul\_id] \bmod(2^{16}) \qquad \text{(Eq. 2)}$$

In some examples, the determined value of RA-RNTI may collide with a previously determined RA-RNTI, or with a reserved value from a reserved range of values, or with a pre-allocated RA-RNTI. In some examples, the RA-RNTI that collides with a previously determined RA-RNTI, a reserved value from a reserved range of values, or a pre-allocated RA-RNTI may be marked as invalid and thus discarded or not used.

In some examples, the random access configuration may indicate a subcarrier spacing (SCS) for random access preambles of a random access procedure. In some examples, the random access configuration may indicate at least one of a periodicity of slots comprising random access channel occasions for transmission of the random access preambles or a limit of frequency domain random access channel occasions, or both. In some examples, the periodicity of the slots and the limit of frequency domain random access channel occasions may be based at least in part on the SCS for the random access preambles. In some examples, UE 115-*c* may determine a RA-RNTI based at least in part on the periodicity of the slots or the limit of frequency domain random access channel occasions, or both, and a slot index for a slot in which the UE is to transmit a random access preamble.

In one example, when the number of frequency RACH occasions are limited to 2 and the indicated SCS is 960 kHz, UE 115-c may determine RA-RNTI based on the following equation:

$$\text{RA-RNTI}=1+s\_id+14\times t\_id+14\times 640\times f\_id+14\times 640\times 2\times ul\_id \quad (\text{Eq. 3})$$

In another example, when time domain RACH occasions and frequency domain RACH occasions are limited based at least in part on RACH occasions being allocated every N slots, up to 4 frequency RACH occasions being allowed, and t_id=floor(slot_index/2), UE 115-c may determine RA-RNTI based on the following equation:

$$\text{RA-RNTI}=1+s\_id+14\times t\_id+14\times 320\times f\_id+14\times 320\times 4\times ul\_id \quad (\text{Eq. 4})$$

In another example, with a 960 KHs SCS, up to 4 frequency RACH occasions, and limiting the supplementary uplink to a relatively low radio frequency spectrum band (e.g., ul_id=0), UE 115-c may determine RA-RNTI based on the following equation:

$$\text{RA-RNTI}=1+s\_id+14\times t\_id+14\times 640\times f\_id+14\times 640\times 4 \quad (\text{Eq. 5})$$

In some examples, UE 115-c may determine to transmit a random access preamble of a random access procedure to establish a connection (e.g., with base station 105-b) on an uplink component carrier. In some examples, UE 115-c may determine a RA-RNTI based at least in part on a type of the uplink component carrier. In some examples, the type of the uplink component carrier may include a normal uplink type or a supplementary uplink type. In some cases, UE 115-c may be configured with a normal uplink carrier and a supplementary uplink carrier. In some examples, the supplementary uplink carrier may operate in a first radio frequency spectrum band (e.g., relatively low radio frequency spectrum band such as a sub-6 GHz frequency spectrum band, or in Frequency Range 1 (FR1) (about 450 MHz to 6 GHz)), and the normal uplink carrier may operate in a second radio frequency spectrum band (e.g., relatively high radio frequency spectrum band such as a millimeter wave spectrum or a frequency spectrum band between 24 GHz and 71 GHz, or between 30 GHz and 300 GHz, etc., or in Frequency Range 2 (FR2) (about 24 GHz to 53 GHz)) that is different from the first radio frequency spectrum band.

In some cases, UE 115-c may use the normal uplink (NUL) carrier when UE 115-c or base station 105-b, or both, determine that a connection between UE 115-c and base station 105-b has a relatively strong signal strength (e.g., the signal strength exceeds a predetermined signal strength threshold), and may switch to use the supplementary uplink (SUL) carrier when the signal strength of the connection is relatively weak (e.g., the signal strength fails to exceed the predetermined signal strength threshold). In some examples, the normal uplink carrier may be in a relatively high radio frequency spectrum band and may use a relatively large SCS for random access preambles. In some examples, the supplementary uplink carrier may be in a relatively low radio frequency spectrum band (e.g., lower than the normal uplink carrier) and may use a relatively small SCS (e.g., smaller than the SCS of the normal uplink carrier) for random access preambles. In some examples, UE 115-c may be configured to determine a first RA-RNTI when UE 115-c is configured to use the normal uplink carrier, and UE 115-c may be configured to determine a second RA-RNTI when UE 115-c is configured to use the supplementary uplink carrier. In some examples, the SCS may be configured at 960 kHz for the normal uplink carrier and the SCS may be configured at 30 kHz for the supplementary uplink carrier. Thus, with a 960 kHz SCS and UE 115-c configured to use the normal uplink carrier (e.g., ul_id=0), UE 115-c may determine RA-RNTI based on the following equation:

$$\text{RA-RNTI}=1+s\_id+14\times t\_id+14\times 640\times f\_id \quad (\text{Eq. 6})$$

And with a 30 kHz SCS and UE 115-c configured to use the supplementary uplink carrier (e.g., ul_id=1), UE 115-c may determine RA-RNTI based on the following equation:

$$\text{RA-RNTI}=1+s\_id+14\times t\_id+14\times 20\times f\_id+14\times 640\times 4 \quad (\text{Eq. 7})$$

In some examples, the random access configuration may indicate a predetermined value used to shift bit values for a RA-RNTI to follow a set of one or more additional radio network temporary identifiers different from the RA-RNTI. In some examples, UE 115-c may determine the RA-RNTI based at least in part on a slot index for a slot in which UE 115-c is to transmit a random access preamble and adding the predetermined value.

In some examples, to avoid RA-RNTI collision with NR extension due to the modular operation to 16 bits, we could allow RA-RNTI to be more than 16 bits. In some examples, to ensure that the determined RA-RNTI avoids on or more other RNTIs (e.g., a system information RNTI, paging RNTI, temporary cell RNTI, modulation coding scheme cell RNTI, configured scheduling RNTI, transmit power control PUCCH RNTI, transmit power control PUSCH RNTI, transmit power control SRS RNTI, interruption RNTI, slot format indication RNTI, semi-persistent CSI RNTI, or any other non-RA-RNTI, or combinations thereof), UE 115-c may determine RA-RNTI based on the following equation:

$$\text{RA-RNTI}=2^{16}+s\_id+14\times t\_id+14\times 640\times f\_id+14\times 640\times 8\times ul\_id \quad (\text{Eq. 8a})$$

In some examples, a message of a downlink control channel and a message of a downlink shared channel may use the RA-RNTI of equation 8a above, which is determined based at least in part on adding the predetermined value (e.g., adding $2^{16}$). In some examples, a message of a downlink control channel (e.g., a physical downlink control channel) may use the RA-RNTI of equation 8a, while a message of a downlink shared channel (e.g., a physical downlink shared channel) may use a second RA-RNTI that is determined by performing a modulo operation between the first RA-RNTI with respect to $2^{16}$ based on the following equation of $$\text{RA-RNTI}=1+[2^{16}+s\_id+14\times t\_id+14\times 640\times f\_id+14\times 640\times 8\times ul\_id]\bmod(2^{16}) \quad (\text{Eq. 8b})$$

Accordingly, the first RA-RNTI may start above FFFF based on using the RA-RNTI of equation 8a, while the second RA-RNTI may remain below FFFF based on using the RA-RNTI of equation 8b.

In some examples, a message of a downlink control channel (e.g., a physical downlink control channel) may use a first RA-RNTI that is determined based on the following equation:

$$\text{RA-RNTI}=1+s\_id+14\times t\_id+14\times 640\times f\_id+14\times 640\times 8\times ul\_id \quad (\text{Eq. 8c})$$

while a message of a downlink shared channel (e.g., a physical downlink shared channel) may use a second RA-RNTI that is determined by performing a modulo operation between the first RA-RNTI with respect to $2^{16}$ based on the following equation of $$\text{RA-RNTI}=1+[s\_id+14 \times t\_id+14 \times 640 \times f\_id+14 \times 640 \times 8 \times ul\_id] \bmod (2^{16}) \quad \text{(Eq. 8d)}$$

Accordingly, a downlink control channel may use a first RA-RNTI based on the equation 8c, while a downlink shared channel may use a second RA-RNTI based on the equation 8d.

In some examples, the random access configuration may indicate resources for UE 115-c to use to transmit a random access preamble. In some examples, UE 115-c may determine a RA-RNTI based at least in part on an ordinal number associated with a RACH occasion of a random access response window corresponding to the indicated resources. In some examples, the RACH occasions may be numbered in ascending order of frequency, time, and UL carrier within each RAR window. In some examples, a RAR window (e.g., a 10 ins RAR window) may include a first RACH occasion, a second RACH occasion, etc. In this example, the first RACH occasion within the RAR window may use RA-RNTI=1, and the second RACH occasion within the RAR window may use RA-RNTI=2, and so on.

At 315, UE 115-c may transmit the random access preamble indicating the determined RA-RNTI. In some examples, UE 115-c may transmit the random access preamble using the resources indicated in the random access configuration. In some examples, UE 115-c may transmit the random access preamble in a slot based at least in part on a slot index for the slot in which UE 115-c transmits the random access preamble. In some examples, UE 115-c may transmit the random access preamble in the indicated time resource associated with the slot index.

At 320, base station 105-b may optionally indicate an uplink carrier type for UE 115-c to use. In some examples, UE 115-c may optionally indicate an uplink carrier type for UE 115-c to use. In some examples, base station 105-b or UE 115-c may determine that UE 115-c is to switch from a first uplink carrier type to a second uplink carrier type. For example, base station 105-b or UE 115-c may determine that UE 115-c is to switch from a normal uplink (NUL) carrier to a supplementary uplink (SUL) carrier, or from a supplementary uplink (SUL) carrier to a normal uplink (NUL) carrier.

At 325, UE 115-c may optionally determine a RA-RNTI (e.g., determine a second RA-RNTI after determining a first RA-RNTI at 310) based at least in part on the indicated uplink carrier type. In some examples, a value of the RA-RNTI determined at 325 may vary based on whether the indicated uplink carrier type indicates a NUL carrier type or a SUL carrier type.

At 330, UE 115-c may optionally transmit a random access preamble (e.g., a second random access preamble after the first random access preamble at 315) indicating the RA-RNTI determined based at least in part on indicated uplink carrier type.

At 335, base station 105-b may optionally transmit a downlink control information based at least in part on UE 115-c transmitting the random access preamble at 330. In some examples, UE 115-c may receive a downlink control information (e.g., from base station 105-b) based at least in part on UE 115-c transmitting the random access preamble. In some examples, the downlink control information may indicate a segment of the random access response window corresponding to RACH occasions. In some examples, the downlink control information provides sub-system frame number (sub-SFN) timing information for relatively high radio frequency spectrum bands.

In some examples, the random access configuration may indicate resources for UE 115-c to use to transmit a random access preamble and a random access response window. In some examples, UE 115-c may determine a RA-RNTI based at least in part on the indicated resources. In some examples, UE 115-c may determine RA-RNTI using the following equation:

$$\text{RA-RNTI}=1+s\_id+14 \times t\_id+14 \times 80 \times f\_id+14 \times 80 \times 8 \times ul\_id \quad \text{(Eq. 9)}$$

while receiving additional system timing information in a separate control message from base station 105-b (e.g., the downlink control information at 335). In some cases, the additional system timing information may be used to schedule a message 2 in a 4-step RACH procedure or to schedule a message B in a 2-step RACH procedure. In some examples, with a 960 kHz SCS and a 10 ms RAR (e.g., RACH occasions every 8 slots), downlink control information of 335 may indicate whether the RACH occasions correspond to a first 1.25 ms segment of the 10 ms RAR, a second 1.25 ms segment of the 10 ms RAR, a third 1.25 ms segment of the 10 ms RAR, a fourth 1.25 ms segment of the 10 ms RAR, a fifth 1.25 ms segment of the 10 ms RAR, a sixth 1.25 ms segment of the 10 ms RAR, a seventh 1.25 ms segment of the 10 ms RAR, or an eight 1.25 ms segment of the 10 ms RAR. In some examples, the downlink control information of 335 may include 3 bits to indicate which 1.25 segment of the 10 ms RAR includes the RACH occasions.

Figure 4:
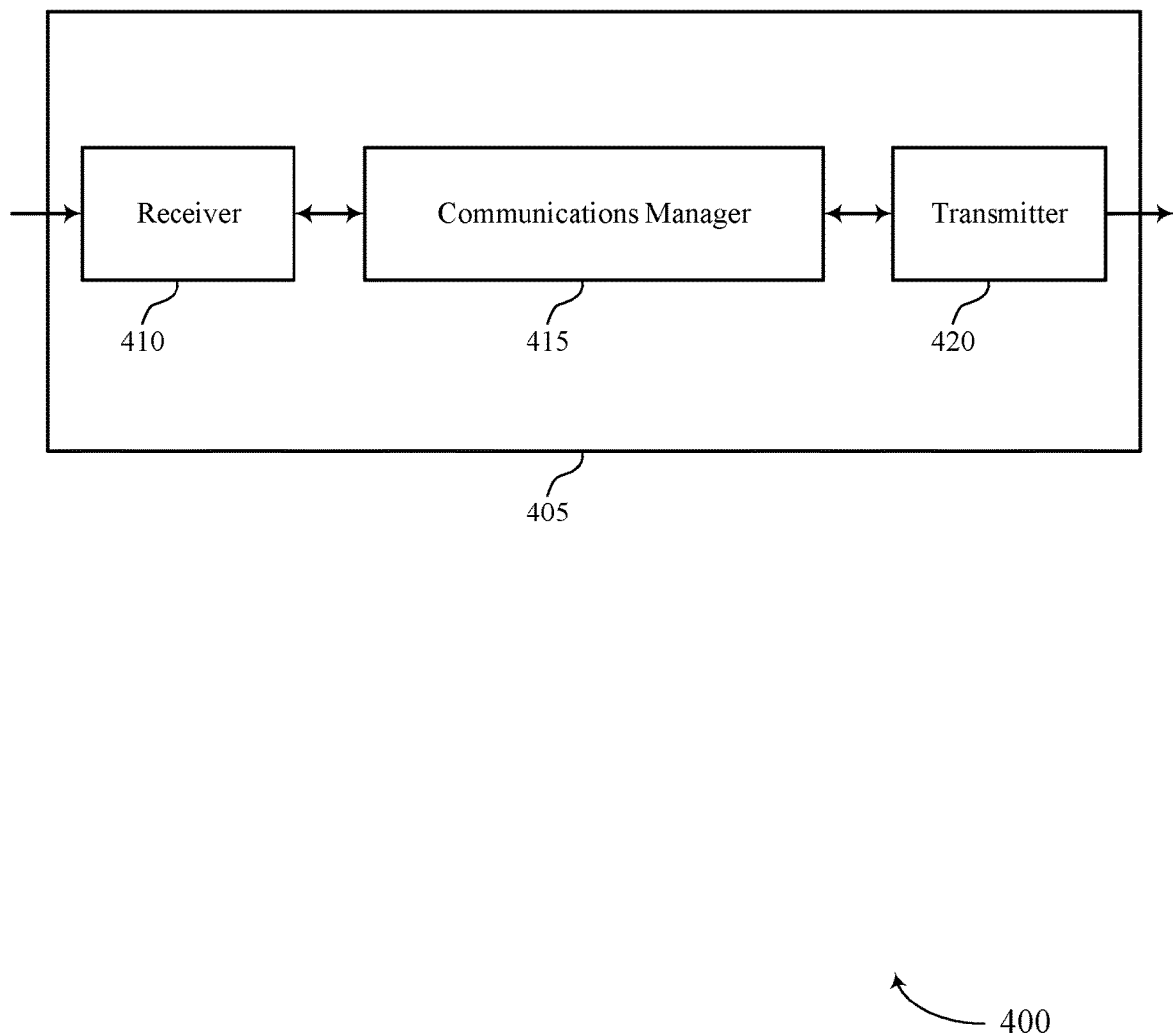
FIGS. 4 and 5 show block diagrams of devices that support indicating system timing information in high band communications in accordance with aspects of the present disclosure.

FIG. 4 shows a block diagram 400 of a device 405 that supports indicating system timing information in high band communications in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to indicating system timing information in high band communications, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive a random access configuration for the UE, the random access configuration indicating a subcarrier spacing for random access preambles of a random access procedure and a periodicity of slots including random access channel occasions for transmission of the random access preambles, where the periodicity of the slots is based on the subcarrier spacing for the random access preambles, determine a RA-RNTI based on the periodicity of the slots and a slot index for a slot in which the UE is to transmit a random access preamble, and transmit, in the slot, the random access preamble indicating the determined RA-RNTI. The communications manager 415 may also receive a random access configuration for the UE, the random access configuration indicating a subcarrier spacing for random access preambles of a random access procedure and a time resource for transmission of a random access preamble, determine a RA-RNTI based on a slot index associated with the time resource and performing a modulo operation that is based on the indicated subcarrier spacing for the random access preambles, and transmit, in the indicated time resource, the random access preamble indicating the determined RA-RNTI. The communications manager 415 may also receive a random access configuration for the UE, the random access configuration indicating a subcarrier spacing for random access preambles of a random access procedure, and at least one of a periodicity of slots including random access channel occasions for transmission of the random access preambles or a limit of frequency domain random access channel occasions, where the periodicity of the slots and the limit of frequency domain random access channel occasions are based on the subcarrier spacing for the random access preambles, determine a RA-RNTI based on the periodicity of the slots or the limit of frequency domain random access channel occasions, or both, and a slot index for a slot in which the UE is to transmit a random access preamble, and transmit, in the slot, the random access preamble indicating the determined RA-RNTI. The communications manager 415 may also determine to transmit a random access preamble of a random access procedure to establish a connection on an uplink component carrier, determine a RA-RNTI based on a type of the uplink component carrier, the type of the uplink component carrier including one of a normal uplink type or a supplementary uplink type, and transmit the random access preamble indicating the determined RA-RNTI. The communications manager 415 may also receive a random access configuration for the UE, the random access configuration indicating a predetermined value used to shift bit values for a RA-RNTI to follow a set of one or more additional radio network temporary identifiers different from the RA-RNTI, determine the RA-RNTI based on a slot index for a slot in which the UE is to transmit a random access preamble and adding the predetermined value, and transmit, in the slot, the random access preamble indicating the determined RA-RNTI. The communications manager 415 may also receive a random access configuration for the UE, the random access configuration indicating resources for the UE to use to transmit a random access preamble, determine a RA-RNTI based on an ordinal number associated with a random access channel occasion of a random access response window corresponding to the indicated resources, and transmit, in the indicated resources, the random access preamble indicating the determined RA-RNTI. The communications manager 415 may also receive a random access configuration for the UE, the random access configuration indicating resources for the UE to use to transmit a random access preamble and a random access response window, receive a downlink control information based on transmitting the random access preamble, the downlink control information indicating a segment of the random access response window corresponding to the RA-RNTI, determine a RA-RNTI based on the indicated resources, and transmit, using the indicated resources, the random access preamble indicating the determined RA-RNTI. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
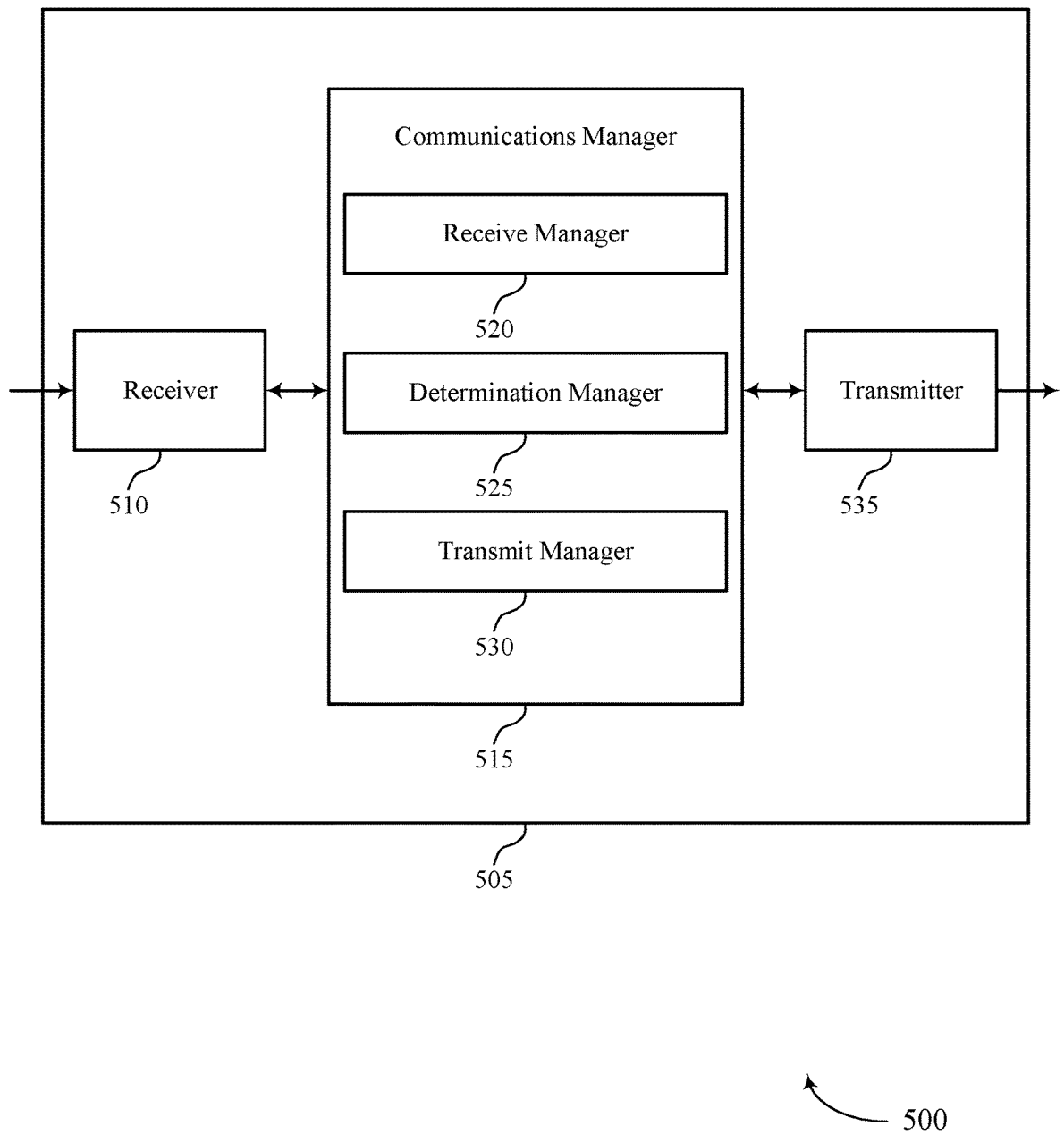

FIG. 5 shows a block diagram 500 of a device 505 that supports indicating system timing information in high band communications in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to indicating system timing information in high band communications, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a receive manager 520, a determination manager 525, and a transmit manager 530. The communications manager 515 may be an example of aspects of the communications manager 710 described herein.

The receive manager 520 may receive a random access configuration for the UE, the random access configuration indicating a subcarrier spacing for random access preambles of a random access procedure and a periodicity of slots including random access channel occasions for transmission of the random access preambles, where the periodicity of the slots is based on the subcarrier spacing for the random access preambles. The determination manager 525 may determine a RA-RNTI based on the periodicity of the slots and a slot index for a slot in which the UE is to transmit a random access preamble. The transmit manager 530 may transmit, in the slot, the random access preamble indicating the determined RA-RNTI.

The receive manager 520 may receive a random access configuration for the UE, the random access configuration indicating a subcarrier spacing for random access preambles of a random access procedure and a time resource for transmission of a random access preamble. The determination manager 525 may determine a RA-RNTI based on a slot index associated with the time resource and performing a modulo operation that is based on the indicated subcarrier spacing for the random access preambles. The transmit manager 530 may transmit, in the indicated time resource, the random access preamble indicating the determined RA-RNTI.

The receive manager 520 may receive a random access configuration for the UE, the random access configuration indicating a subcarrier spacing for random access preambles of a random access procedure, and at least one of a periodicity of slots including random access channel occasions for transmission of the random access preambles or a limit of frequency domain random access channel occasions, where the periodicity of the slots and the limit of frequency domain random access channel occasions are based on the subcarrier spacing for the random access preambles. The determination manager 525 may determine a RA-RNTI based on the periodicity of the slots or the limit of frequency domain random access channel occasions, or both, and a slot index for a slot in which the UE is to transmit a random access preamble. The transmit manager 530 may transmit, in the slot, the random access preamble indicating the determined RA-RNTI.

The determination manager 525 may determine to transmit a random access preamble of a random access procedure to establish a connection on an uplink component carrier. The determination manager 525 determine a RA-RNTI based on a type of the uplink component carrier, the type of the uplink component carrier including one of a normal uplink type or a supplementary uplink type. The transmit manager 530 may transmit the random access preamble indicating the determined RA-RNTI.

The receive manager 520 may receive a random access configuration for the UE, the random access configuration indicating a predetermined value used to shift bit values for a RA-RNTI to follow a set of one or more additional radio network temporary identifiers different from the RA-RNTI. The determination manager 525 may determine the RA-RNTI based on a slot index for a slot in which the UE is to transmit a random access preamble and adding the predetermined value. The transmit manager 530 may transmit, in the slot, the random access preamble indicating the determined RA-RNTI.

The receive manager 520 may receive a random access configuration for the UE, the random access configuration indicating resources for the UE to use to transmit a random access preamble. The determination manager 525 may determine a RA-RNTI based on an ordinal number associated with a random access channel occasion of a random access response window corresponding to the indicated resources. The transmit manager 530 may transmit, in the indicated resources, the random access preamble indicating the determined RA-RNTI.

The receive manager 520 may receive a random access configuration for the UE, the random access configuration indicating resources for the UE to use to transmit a random access preamble and a random access response window and receive a downlink control information based on transmitting the random access preamble, the downlink control information indicating a segment of the random access response window corresponding to the RA-RNTI. The determination manager 525 may determine a RA-RNTI based on the indicated resources. The transmit manager 530 may transmit, using the indicated resources, the random access preamble indicating the determined RA-RNTI.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
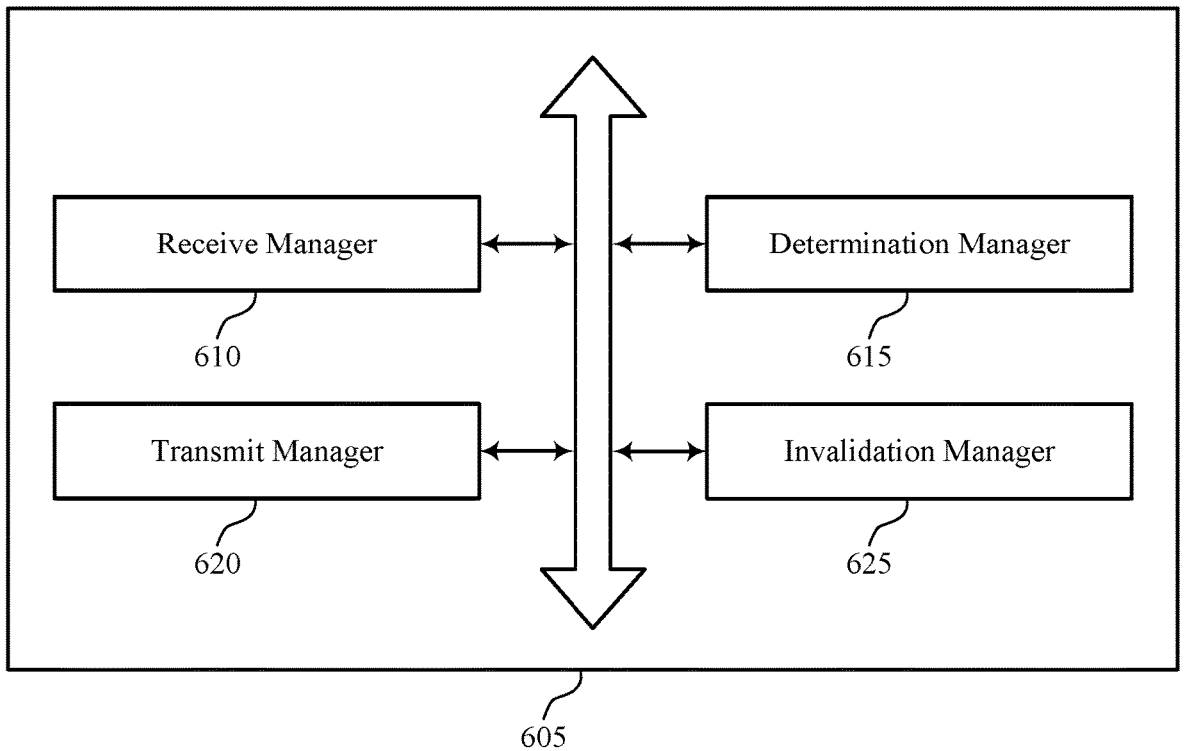
FIG. 6 shows a block diagram of a communications manager that supports indicating system timing information in high band communications in accordance with aspects of the present disclosure.

FIG. 6 shows a block diagram 600 of a communications manager 605 that supports indicating system timing information in high band communications in accordance with aspects of the present disclosure. The communications manager 605 may be an example of aspects of a communications manager 415, a communications manager 515, or a communications manager 710 described herein. The communications manager 605 may include a receive manager 610, a determination manager 615, a transmit manager 620, and an invalidation manager 625. Each of these modules may communicate, directly or indirectly, with one another (e.g., via one or more buses).

The receive manager 610 may receive a random access configuration for the UE, the random access configuration indicating a subcarrier spacing for random access preambles of a random access procedure and a periodicity of slots including random access channel occasions for transmission of the random access preambles, where the periodicity of the slots is based on the subcarrier spacing for the random access preambles. The determination manager 615 may determine a RA-RNTI based on the periodicity of the slots and a slot index for a slot in which the UE is to transmit a random access preamble. The transmit manager 620 may transmit, in the slot, the random access preamble indicating the determined RA-RNTI.

In some cases, the periodicity of slots is based on the random access channel occasions being allocated every N slots for the subcarrier spacing, where N is a positive integer greater than 1. In some cases, the subcarrier spacing includes a N*120 kilohertz subcarrier spacing. In some cases, a range of the slot index of the RA-RNTI ranges from zero to a value determined based on a floor operation, where the floor operation performed on a ratio of the slot index to N. In some cases, the slot index is an index of a first slot of a random access channel occasion in a random access response window.

The receive manager 610 may receive a random access configuration for the UE, the random access configuration indicating a subcarrier spacing for random access preambles of a random access procedure and a time resource for transmission of a random access preamble. The determination manager 615 may determine a RA-RNTI based on a slot index associated with the time resource and performing a modulo operation that is based on the indicated subcarrier spacing for the random access preambles. The transmit manager 620 may transmit, in the indicated time resource, the random access preamble indicating the determined RA-RNTI.

In some examples, the determination manager 615 may determine that the RA-RNTI collides with a previously determined RA-RNTI, or collides with a reserved value from a reserved range of values, or collides with a pre-allocated RA-RNTI. The invalidation manager 625 may mark the RA-RNTI as invalid based on the determining.

In some cases, the pre-allocated RA-RNTI includes a paging RA-RNTI or a system information RA-RNTI. In some cases, a slot index ranges from zero to N*80 for a subcarrier spacing of N*120 kilohertz, where N is a positive integer greater than 1 (e.g., ranges from 1 to 32, or ranges from 1 to 64, or ranges from 1 to 128, or ranges from 1 to 256, or ranges from 1 to 512, etc.). In some cases, a random access response window is M milliseconds, where M is a positive integer that ranges from 1 to 40.

The receive manager 610 may receive a random access configuration for the UE, the random access configuration indicating a subcarrier spacing for random access preambles of a random access procedure, and at least one of a periodicity of slots including random access channel occasions for transmission of the random access preambles or a limit of frequency domain random access channel occasions, where the periodicity of the slots and the limit of frequency domain random access channel occasions are based on the subcarrier spacing for the random access preambles. The determination manager 615 may determine a RA-RNTI based on the periodicity of the slots or the limit of frequency domain random access channel occasions, or both, and a slot index for a slot in which the UE is to transmit a random access preamble. The transmit manager 620 may transmit, in the slot, the random access preamble indicating the determined RA-RNTI.

In some cases, a number of frequency domain random access channel occasions is 1 or 2 when the subcarrier spacing is 960 kilohertz and an uplink carrier identifier is set to 1. In some cases, a number of frequency domain random access channel occasions is between zero and 4 when the subcarrier spacing is 960 kilohertz and an uplink carrier identifier is set to 1, or the uplink carrier identifier is set to zero and the periodicity of slots is set to every other slot. In some cases, the random access configuration indicates an extension of the slot index based on the subcarrier spacing for the random access preambles.

In some cases, a number of frequency domain random access channel occasions is between zero and 4, and a number of time domain random access channel occasions by allocating the random access channel occasions every other slot when the number of frequency domain random access channel occasions is between zero and 4. In some cases, a slot index ranges from zero to 320 when the number of frequency domain random access channel occasions are between zero and 4 and an uplink carrier identifier is set to 1. In some cases, a number of frequency domain random access channel occasions is between zero and 4 when an uplink carrier identifier is set to zero. In some cases, a slot index ranges from zero to 640 when the number of frequency domain random access channel occasions are limited between zero and 4 and the uplink carrier identifier is set to zero. In some cases, the number of frequency domain random access channel occasions are between zero and 4 when the subcarrier spacing is 960 kilohertz and the uplink carrier identifier is set to zero.

The determination manager 615 may determine to transmit a random access preamble of a random access procedure to establish a connection on an uplink component carrier. In some examples, the determination manager 615 may determine a RA-RNTI based on a type of the uplink component carrier, the type of the uplink component carrier including one of a normal uplink type or a supplementary uplink type. The transmit manager 620 may transmit the random access preamble indicating the determined RA-RNTI.

In some cases, a first subcarrier spacing associated with the normal uplink type includes a N*120 kilohertz subcarrier spacing, where N is a positive integer greater than 1. In some cases, a first slot index associated with the normal uplink type ranges from zero to N*80. In some cases, a second subcarrier spacing associated with the supplementary uplink type includes a 120/Q kilohertz subcarrier spacing, where Q is a positive integer that ranges from 1 to 8. In some cases, a second slot index associated with the supplementary uplink type ranges from zero to 80/Q. In some cases, the uplink component carrier of the supplementary uplink type operates in a first radio frequency spectrum band, and where the uplink component carrier of the normal uplink type operates in a second radio frequency spectrum band different from the first radio frequency spectrum band.

The receive manager 610 may receive a random access configuration for the UE, the random access configuration indicating a predetermined value used to shift bit values for a RA-RNTI to follow a set of one or more additional radio network temporary identifiers different from the RA-RNTI. The determination manager 615 may determine the RA-RNTI based on a slot index for a slot in which the UE is to transmit a random access preamble and adding the predetermined value. The transmit manager 620 may transmit, in the slot, the random access preamble indicating the determined RA-RNTI.

In some cases, the predetermined value includes a hexadecimal value of FFFF. In some cases, a message of a downlink control channel and a message of a downlink shared channel use the RA-RNTI that is determined based on adding the predetermined value. In some cases, a message of a downlink control channel uses the RA-RNTI that is determined based on adding the predetermined value, and a message of a downlink shared channel uses a second RA-RNTI that is determined without adding the predetermined value.

The receive manager 610 may receive a random access configuration for the UE, the random access configuration indicating resources for the UE to use to transmit a random access preamble. The determination manager 615 may determine a RA-RNTI based on an ordinal number associated with a random access channel occasion of a random access response window corresponding to the indicated resources. The transmit manager 620 may transmit, in the indicated resources, the random access preamble indicating the determined RA-RNTI.

In some examples, the determination manager 615 may set an Nth RA-RNTI equal to N. In some examples, N may be a positive integer that ranges from 1 to a predetermined number of random access channel occasions within the random access response window. In some cases, an Nth random access channel occasion of the random access response window uses the Nth RA-RNTI.

The receive manager 610 may receive a random access configuration for the UE, the random access configuration indicating resources for the UE to use to transmit a random access preamble and a random access response window. The determination manager 615 may determine a RA-RNTI based on the indicated resources. The transmit manager 620 may transmit, using the indicated resources, the random access preamble indicating the determined RA-RNTI. In some examples, the receive manager 610 may receive a downlink control information based on transmitting the random access preamble, the downlink control information indicating a segment of the random access response window corresponding to the RA-RNTI.

In some cases, the downlink control information indicates X bits. In some examples, X may be a positive integer that ranges from 3 to 5 and the random access response window includes at least a 1 millisecond window (e.g., 5 millisecond window, 10 millisecond window, 40 millisecond window, etc.).

Figure 7:
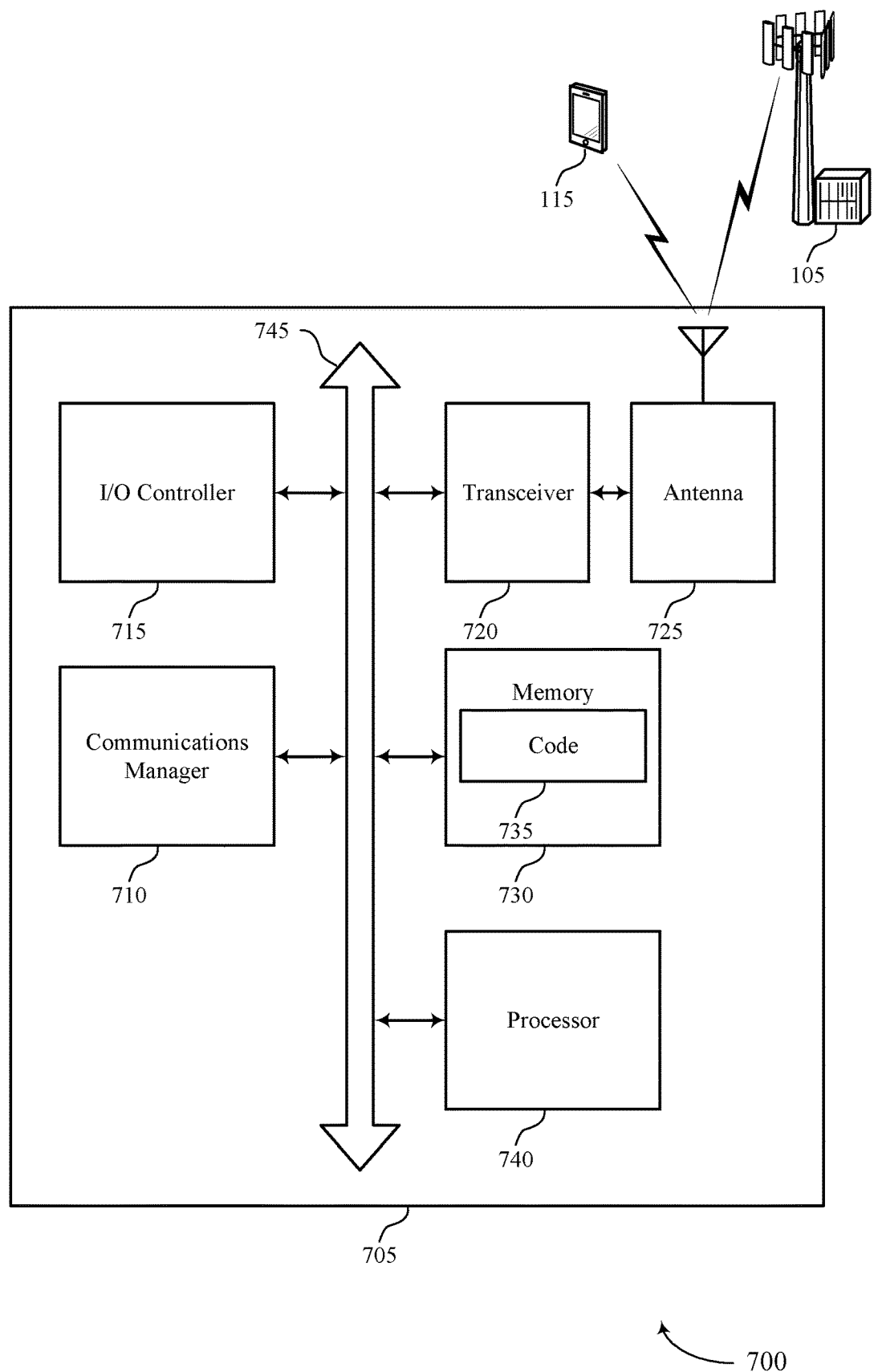
FIG. 7 shows a diagram of a system including a device that supports indicating system timing information in high band communications in accordance with aspects of the present disclosure.

FIG. 7 shows a diagram of a system 700 including a device 705 that supports indicating system timing information in high band communications in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be coupled and/or in electronic communication via one or more buses (e.g., bus 745).

The communications manager 710 may receive a random access configuration for the UE, the random access configuration indicating a subcarrier spacing for random access preambles of a random access procedure and a periodicity of slots including random access channel occasions for transmission of the random access preambles, where the periodicity of the slots is based on the subcarrier spacing for the random access preambles, determine a RA-RNTI based on the periodicity of the slots and a slot index for a slot in which the UE is to transmit a random access preamble, and transmit, in the slot, the random access preamble indicating the determined RA-RNTI. The communications manager 710 may also receive a random access configuration for the UE, the random access configuration indicating a subcarrier spacing for random access preambles of a random access procedure and a time resource for transmission of a random access preamble, determine a RA-RNTI based on a slot index associated with the time resource and performing a modulo operation that is based on the indicated subcarrier spacing for the random access preambles, and transmit, in the indicated time resource, the random access preamble indicating the determined RA-RNTI. The communications manager 710 may also receive a random access configuration for the UE, the random access configuration indicating a subcarrier spacing for random access preambles of a random access procedure, and at least one of a periodicity of slots including random access channel occasions for transmission of the random access preambles or a limit of frequency domain random access channel occasions, where the periodicity of the slots and the limit of frequency domain random access channel occasions are based on the subcarrier spacing for the random access preambles, determine a RA-RNTI based on the periodicity of the slots or the limit of frequency domain random access channel occasions, or both, and a slot index for a slot in which the UE is to transmit a random access preamble, and transmit, in the slot, the random access preamble indicating the determined RA-RNTI. The communications manager 710 may also determine to transmit a random access preamble of a random access procedure to establish a connection on an uplink component carrier, determine a RA-RNTI based on a type of the uplink component carrier, the type of the uplink component carrier including one of a normal uplink type or a supplementary uplink type, and transmit the random access preamble indicating the determined RA-RNTI. The communications manager 710 may also receive a random access configuration for the UE, the random access configuration indicating a predetermined value used to shift bit values for a RA-RNTI to follow a set of one or more additional radio network temporary identifiers different from the RA-RNTI, determine the RA-RNTI based on a slot index for a slot in which the UE is to transmit a random access preamble and adding the predetermined value, and transmit, in the slot, the random access preamble indicating the determined RA-RNTI. The communications manager 710 may also receive a random access configuration for the UE, the random access configuration indicating resources for the UE to use to transmit a random access preamble, determine a RA-RNTI based on an ordinal number associated with a random access channel occasion of a random access response window corresponding to the indicated resources, and transmit, in the indicated resources, the random access preamble indicating the determined RA-RNTI. The communications manager 710 may also receive a random access configuration for the UE, the random access configuration indicating resources for the UE to use to transmit a random access preamble and a random access response window, receive a downlink control information based on transmitting the random access preamble, the downlink control information indicating a segment of the random access response window corresponding to the RA-RNTI, determine a RA-RNTI based on the indicated resources, and transmit, using the indicated resources, the random access preamble indicating the determined RA-RNTI.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDRROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting indicating system timing information in high band communications).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
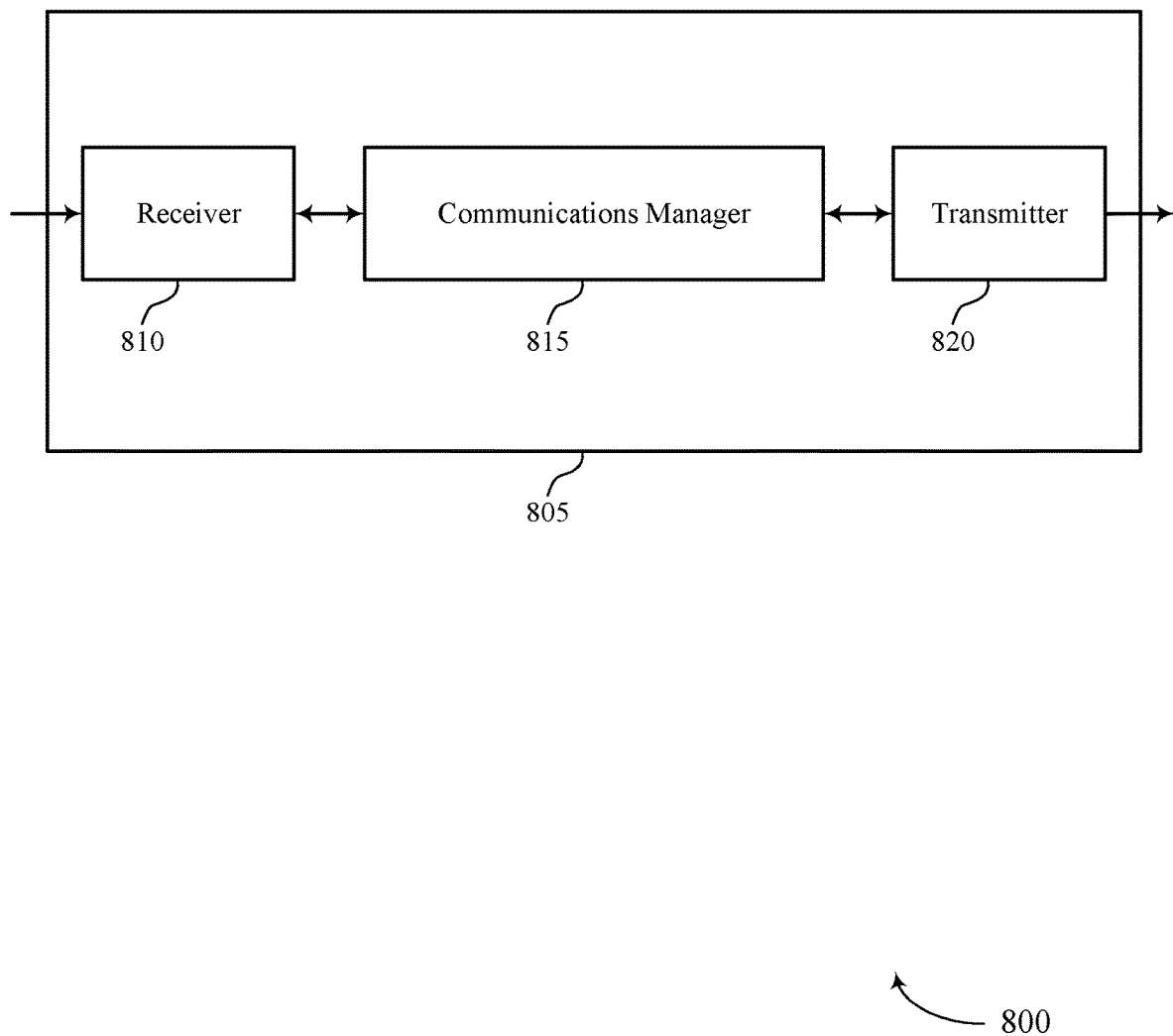
FIGS. 8 and 9 show block diagrams of devices that support indicating system timing information in high band communications in accordance with aspects of the present disclosure.

FIG. 8 shows a block diagram 800 of a device 805 that supports indicating system timing information in high band communications in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to indicating system timing information in high band communications, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may configure a random access configuration to indicate a subcarrier spacing for random access preambles of a random access procedure and a periodicity of slots including random access channel occasions for transmission of the random access preambles, where the periodicity of the slots is based on the subcarrier spacing for the random access preambles, broadcast the random access configuration, receive a random access preamble, the random access preamble indicating a RA-RNTI that is based on the random access configuration and a slot index for a slot in which the random access preamble is received, configure a random access configuration to indicate a subcarrier spacing for random access preambles of a random access procedure and a time resource associated with the random access preambles, broadcast the random access configuration, receive a random access preamble, the random access preamble indicating a RA-RNTI that is based on the random access configuration, a modulo operation that is based on the indicated subcarrier spacing for the random access preambles, and a slot index, associated with the time resource, for a slot in which the random access preamble is received, configure a random access configuration to indicate a subcarrier spacing for random access preambles of a random access procedure, and at least one of a periodicity of slots including random access channel occasions for transmission of the random access preambles or a limit of frequency domain random access channel occasions, where the periodicity of the slots and the limit of frequency domain random access channel occasions are based on the subcarrier spacing for the random access preambles, broadcast the random access configuration, receive a random access preamble, the random access preamble indicating a RA-RNTI that is based on the random access configuration and the periodicity of the slots or the limit of frequency domain random access channel occasions, or both, and a slot index for a slot in which the random access preamble is received, configure a random access configuration to indicate a normal uplink carrier and a supplementary uplink carrier, broadcast the random access configuration on the normal uplink carrier or the supplementary uplink carrier, or both, receive, on the normal uplink carrier or the supplementary uplink carrier, a random access preamble, the random access preamble indicating a RA-RNTI that is based on the normal uplink carrier or the supplementary uplink carrier, configure a random access configuration to indicate a predetermined value used to shift bit values for a RA-RNTI to follow a set of one or more additional radio network temporary identifiers different from the RA-RNTI, broadcast the random access configuration, receive a random access preamble, the random access preamble indicating a RA-RNTI that is based on the random access configuration, the predetermined value being added, and a slot index for a slot in which the random access preamble is received, configure a random access configuration to indicate resources for a random access preamble, broadcast the random access configuration, configure a random access configuration to indicate resources for a random access preamble and a random access response window, broadcast the random access configuration, transmit a downlink control information based on receiving the random access preamble, the downlink control information indicating a segment of the random access response window corresponding to the RA-RNTI, and receive a random access preamble, the random access preamble indicating a RA-RNTI that is based on the random access configuration and on the indicated resources. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
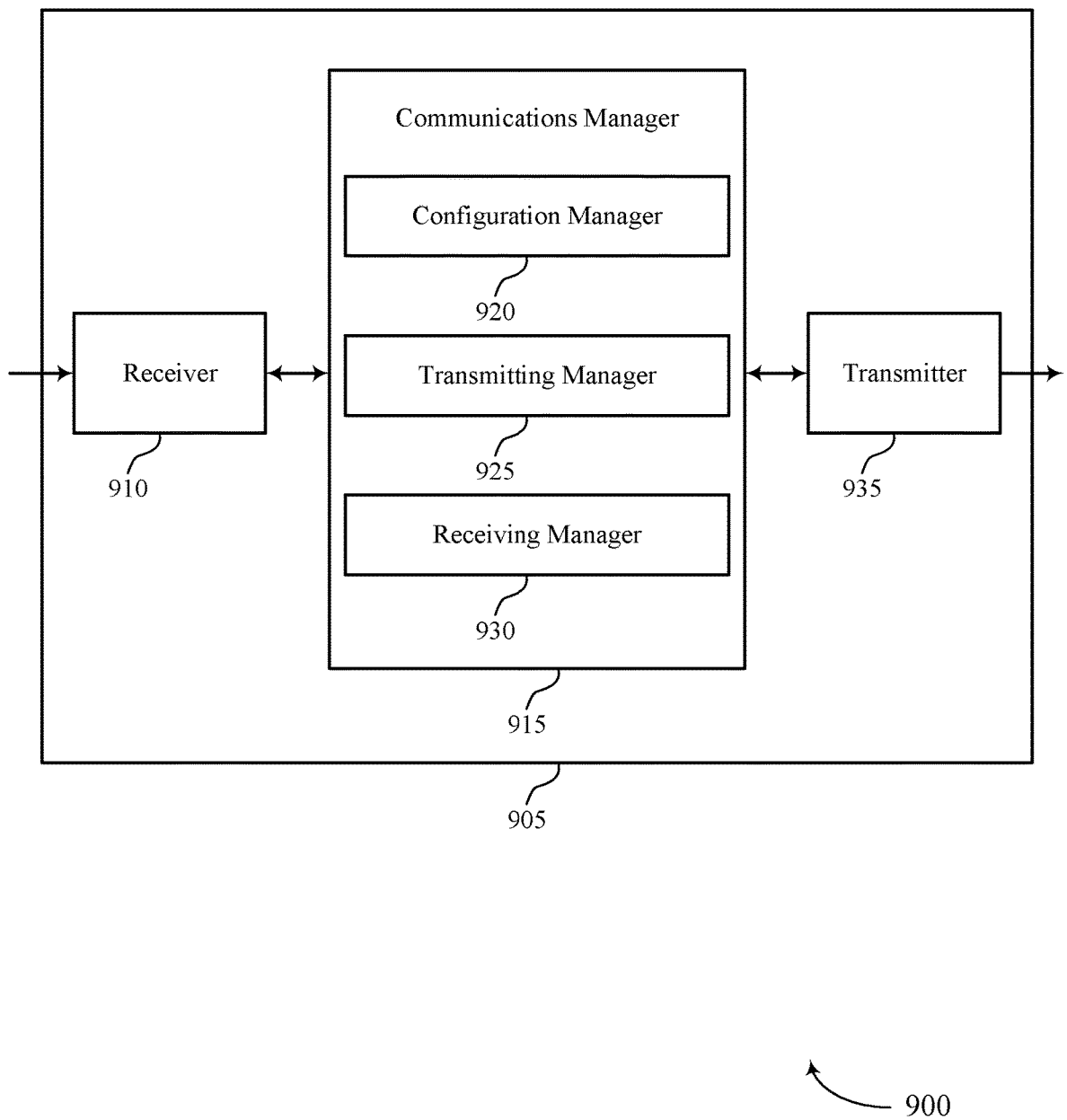

FIG. 9 shows a block diagram 900 of a device 905 that supports indicating system timing information in high band communications in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to indicating system timing information in high band communications, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration manager 920, a transmitting manager 925, and a receiving manager 930. The communications manager 915 may be an example of aspects of the communications manager 1110 described herein.

The configuration manager 920 may configure a random access configuration to indicate a subcarrier spacing for random access preambles of a random access procedure and a periodicity of slots including random access channel occasions for transmission of the random access preambles, where the periodicity of the slots is based on the subcarrier spacing for the random access preambles. The transmitting manager 925 may broadcast the random access configuration. The receiving manager 930 may receive a random access preamble, the random access preamble indicating a RA-RNTI that is based on the random access configuration and a slot index for a slot in which the random access preamble is received.

The configuration manager 920 may configure a random access configuration to indicate a subcarrier spacing for random access preambles of a random access procedure and a time resource associated with the random access preambles. The transmitting manager 925 may broadcast the random access configuration. The receiving manager 930 may receive a random access preamble, the random access preamble indicating a RA-RNTI that is based on the random access configuration, a modulo operation that is based on the indicated subcarrier spacing for the random access preambles, and a slot index, associated with the time resource, for a slot in which the random access preamble is received.

The configuration manager 920 may configure a random access configuration to indicate a subcarrier spacing for random access preambles of a random access procedure, and at least one of a periodicity of slots including random access channel occasions for transmission of the random access preambles or a limit of frequency domain random access channel occasions, where the periodicity of the slots and the limit of frequency domain random access channel occasions are based on the subcarrier spacing for the random access preambles. The transmitting manager 925 may broadcast the random access configuration. The receiving manager 930 may receive a random access preamble, the random access preamble indicating a RA-RNTI that is based on the random access configuration and the periodicity of the slots or the limit of frequency domain random access channel occasions, or both, and a slot index for a slot in which the random access preamble is received.

The configuration manager 920 may configure a random access configuration to indicate a normal uplink carrier and a supplementary uplink carrier. The transmitting manager 925 may broadcast the random access configuration on the normal uplink carrier or the supplementary uplink carrier, or both. The receiving manager 930 may receive, on the normal uplink carrier or the supplementary uplink carrier, a random access preamble, the random access preamble indicating a RA-RNTI that is based on the normal uplink carrier or the supplementary uplink carrier.

The configuration manager 920 may configure a random access configuration to indicate a predetermined value used to shift bit values for a RA-RNTI to follow a set of one or more additional radio network temporary identifiers different from the RA-RNTI. The transmitting manager 925 may broadcast the random access configuration. The receiving manager 930 may receive a random access preamble, the random access preamble indicating a RA-RNTI that is based on the random access configuration, the predetermined value being added, and a slot index for a slot in which the random access preamble is received.

The configuration manager 920 may configure a random access configuration to indicate resources for a random access preamble. The transmitting manager 925 may broadcast the random access configuration. The receiving manager 930 may receive a random access preamble, the random access preamble indicating a RA-RNTI that is based at least in part on the random access configuration and an ordinal number associated with a random access channel occasion of a random access response window corresponding to the indicated resources.

The configuration manager 920 may configure a random access configuration to indicate resources for a random access preamble and a random access response window. The transmitting manager 925 may broadcast the random access configuration. The receiving manager 930 may receive a random access preamble, the random access preamble indicating a RA-RNTI that is based on the random access configuration and on the indicated resources. The transmitting manager 925 may transmit a downlink control information based on receiving the random access preamble. In some examples, the downlink control information may indicate a segment of the random access response window corresponding to the RA-RNTI.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
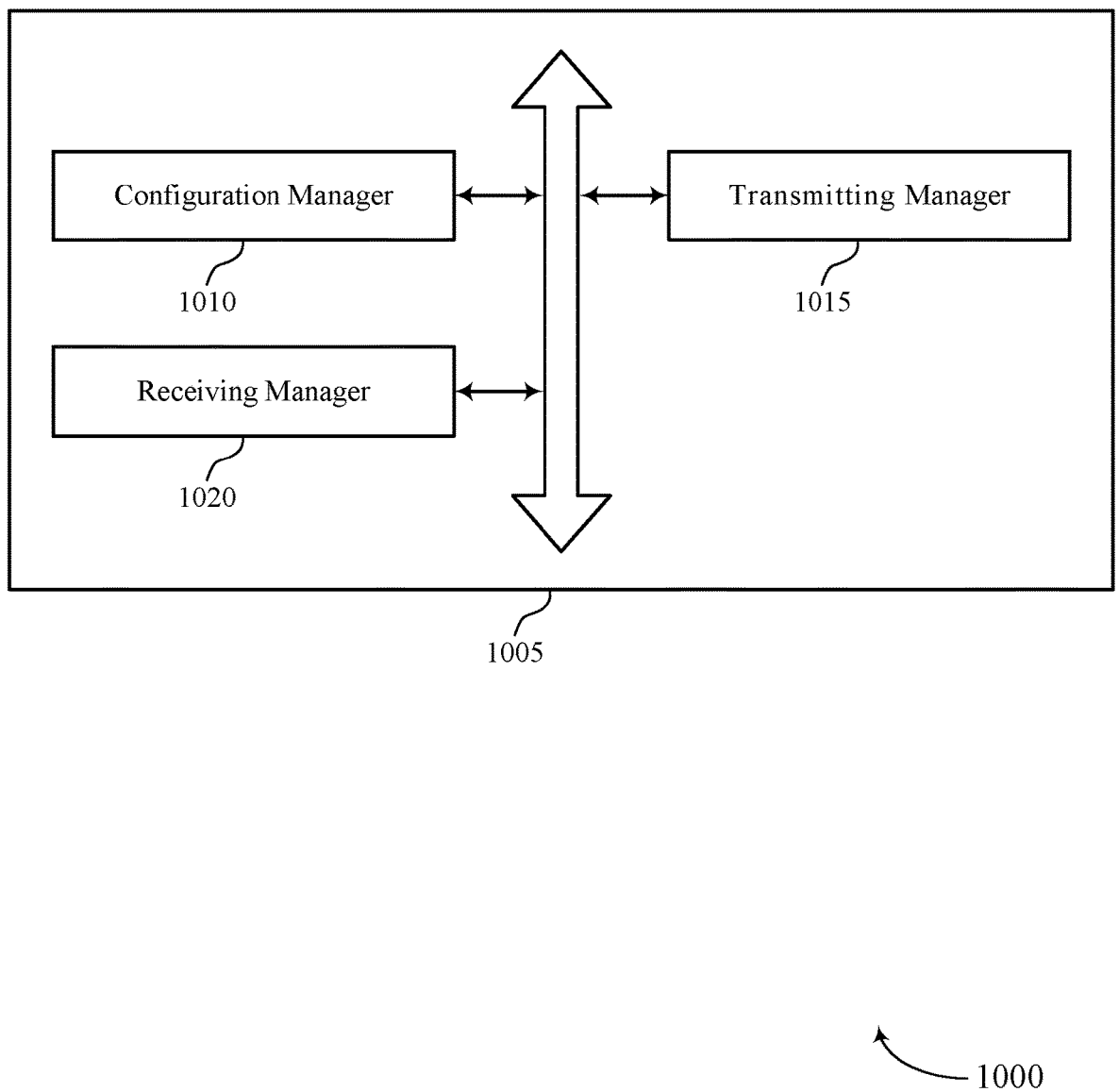
FIG. 10 shows a block diagram of a communications manager that supports indicating system timing information in high band communications in accordance with aspects of the present disclosure.

FIG. 10 shows a block diagram 1000 of a communications manager 1005 that supports indicating system timing information in high band communications in accordance with aspects of the present disclosure. The communications manager 1005 may be an example of aspects of a communications manager 815, a communications manager 915, or a communications manager 1110 described herein. The communications manager 1005 may include a configuration manager 1010, a transmitting manager 1015, and a receiving manager 1020. Each of these modules may communicate, directly or indirectly, with one another (e.g., via one or more buses).

The configuration manager 1010 may configure a random access configuration to indicate a subcarrier spacing for random access preambles of a random access procedure and a periodicity of slots including random access channel occasions for transmission of the random access preambles, where the periodicity of the slots is based on the subcarrier spacing for the random access preambles. The transmitting manager 1015 may broadcast the random access configuration. In some examples, the receiving manager 1020 may receive a random access preamble, the random access preamble indicating a RA-RNTI that is based on the random access configuration and a slot index for a slot in which the random access preamble is received.

The configuration manager 1010 may configure a random access configuration to indicate a subcarrier spacing for random access preambles of a random access procedure and a time resource associated with the random access preambles. The transmitting manager 1015 may broadcast the random access configuration. The receiving manager 1020 may receive a random access preamble, the random access preamble indicating a RA-RNTI that is based on the random access configuration, a modulo operation that is based on the indicated subcarrier spacing for the random access preambles, and a slot index, associated with the time resource, for a slot in which the random access preamble is received.

The configuration manager 1010 may configure a random access configuration to indicate a subcarrier spacing for random access preambles of a random access procedure, and at least one of a periodicity of slots including random access channel occasions for transmission of the random access preambles or a limit of frequency domain random access channel occasions, where the periodicity of the slots and the limit of frequency domain random access channel occasions are based on the subcarrier spacing for the random access preambles. The transmitting manager 1015 may broadcast the random access configuration. The receiving manager 1020 may receive a random access preamble, the random access preamble indicating a RA-RNTI that is based on the random access configuration and the periodicity of the slots or the limit of frequency domain random access channel occasions, or both, and a slot index for a slot in which the random access preamble is received.

The configuration manager 1010 may configure a random access configuration to indicate a normal uplink carrier and a supplementary uplink carrier. The transmitting manager 1015 may broadcast the random access configuration on the normal uplink carrier or the supplementary uplink carrier, or both. The receiving manager 1020 may receive, on the normal uplink carrier or the supplementary uplink carrier, a random access preamble, the random access preamble indicating a RA-RNTI that is based on the normal uplink carrier or the supplementary uplink carrier.

The configuration manager 1010 may configure a random access configuration to indicate a predetermined value used to shift bit values for a RA-RNTI to follow a set of one or more additional radio network temporary identifiers different from the RA-RNTI. The transmitting manager 1015 may broadcast the random access configuration. The receiving manager 1020 may receive a random access preamble, the random access preamble indicating a RA-RNTI that is based on the random access configuration, the predetermined value being added, and a slot index for a slot in which the random access preamble is received.

The configuration manager 1010 may configure a random access configuration to indicate resources for a random access preamble. The transmitting manager 1015 may broadcast the random access configuration. The receiving manager 1020 may receive a random access preamble, the random access preamble indicating a RA-RNTI that is based at least in part on the random access configuration and an ordinal number associated with a random access channel occasion of a random access response window corresponding to the indicated resources.

The configuration manager 1010 may configure a random access configuration to indicate resources for a random access preamble and a random access response window. The transmitting manager 1015 may broadcast the random access configuration. The receiving manager 1020 may receive a random access preamble, the random access preamble indicating a RA-RNTI that is based on the random access configuration and on the indicated resources. In some examples, the transmitting manager 1015 may transmit a downlink control information based on receiving the random access preamble, the downlink control information indicating a segment of the random access response window corresponding to the RA-RNTI.

Figure 11:
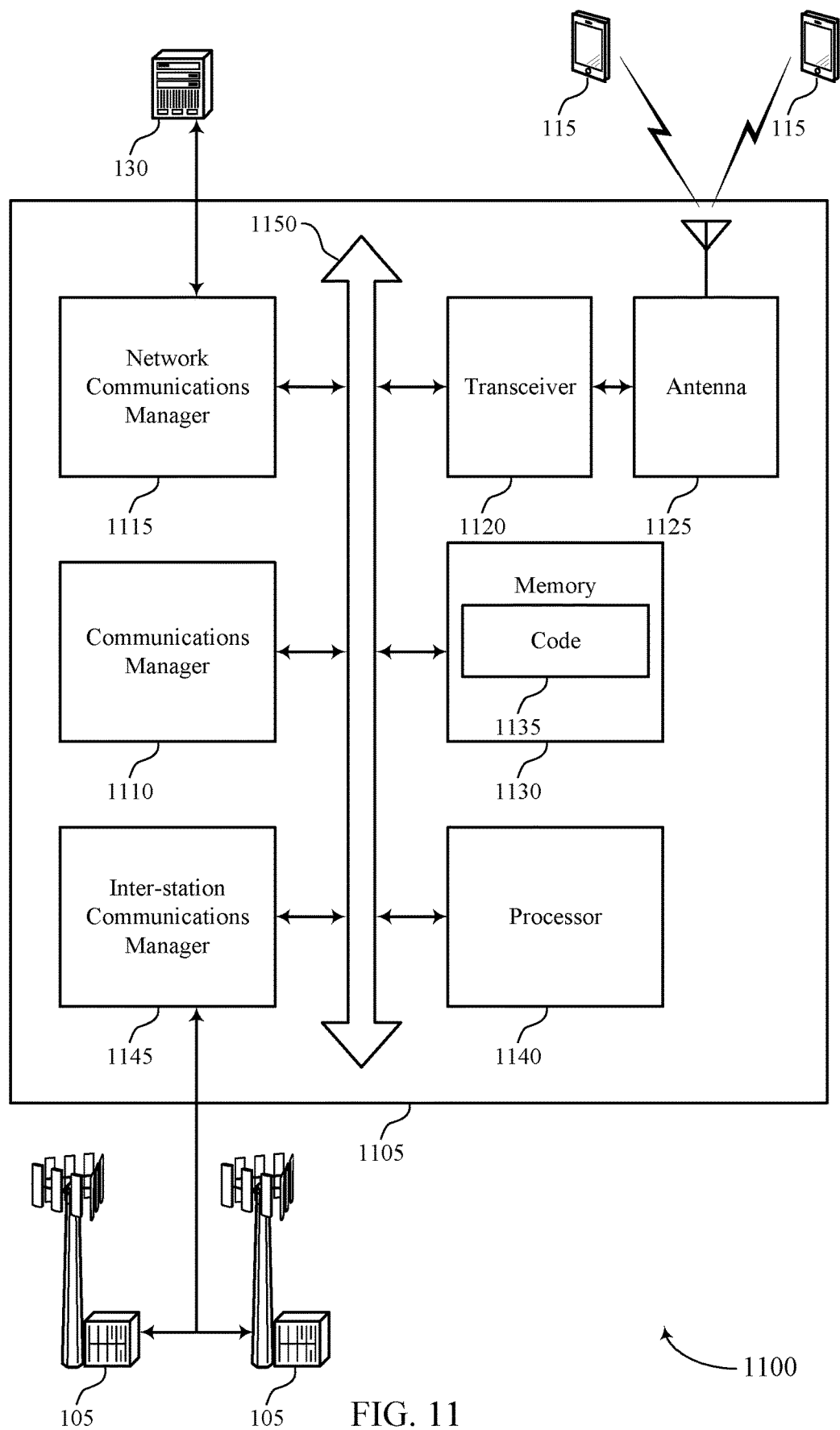
FIG. 11 shows a diagram of a system including a device that supports indicating system timing information in high band communications in accordance with aspects of the present disclosure.

FIG. 11 shows a diagram of a system 1100 including a device 1105 that supports indicating system timing information in high band communications in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be coupled and/or in electronic communication via one or more buses (e.g., bus 1150).

The communications manager 1110 may configure a random access configuration to indicate a subcarrier spacing for random access preambles of a random access procedure and a periodicity of slots including random access channel occasions for transmission of the random access preambles, where the periodicity of the slots is based on the subcarrier spacing for the random access preambles, broadcast the random access configuration, receive a random access preamble, the random access preamble indicating a RA-RNTI that is based on the random access configuration and a slot index for a slot in which the random access preamble is received, configure a random access configuration to indicate a subcarrier spacing for random access preambles of a random access procedure and a time resource associated with the random access preambles, broadcast the random access configuration, receive a random access preamble, the random access preamble indicating a RA-RNTI that is based on the random access configuration, a modulo operation that is based on the indicated subcarrier spacing for the random access preambles, and a slot index, associated with the time resource, for a slot in which the random access preamble is received, configure a random access configuration to indicate a subcarrier spacing for random access preambles of a random access procedure, and at least one of a periodicity of slots including random access channel occasions for transmission of the random access preambles or a limit of frequency domain random access channel occasions, where the periodicity of the slots and the limit of frequency domain random access channel occasions are based on the subcarrier spacing for the random access preambles, broadcast the random access configuration, receive a random access preamble, the random access preamble indicating a RA-RNTI that is based on the random access configuration and the periodicity of the slots or the limit of frequency domain random access channel occasions, or both, and a slot index for a slot in which the random access preamble is received, configure a random access configuration to indicate a normal uplink carrier and a supplementary uplink carrier, broadcast the random access configuration on the normal uplink carrier or the supplementary uplink carrier, or both, receive, on the normal uplink carrier or the supplementary uplink carrier, a random access preamble, the random access preamble indicating a RA-RNTI that is based on the normal uplink carrier or the supplementary uplink carrier, configure a random access configuration to indicate a predetermined value used to shift bit values for a RA-RNTI to follow a set of one or more additional radio network temporary identifiers different from the RA-RNTI, broadcast the random access configuration, receive a random access preamble, the random access preamble indicating a RA-RNTI that is based on the random access configuration, the predetermined value being added, and a slot index for a slot in which the random access preamble is received, configure a random access configuration to indicate resources for a random access preamble, broadcast the random access configuration, configure a random access configuration to indicate resources for a random access preamble and a random access response window, broadcast the random access configuration, transmit a downlink control information based on receiving the random access preamble, the downlink control information indicating a segment of the random access response window corresponding to the RA-RNTI, and receive a random access preamble, the random access preamble indicating a RA-RNTI that is based on the random access configuration and on the indicated resources.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting indicating system timing information in high band communications).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
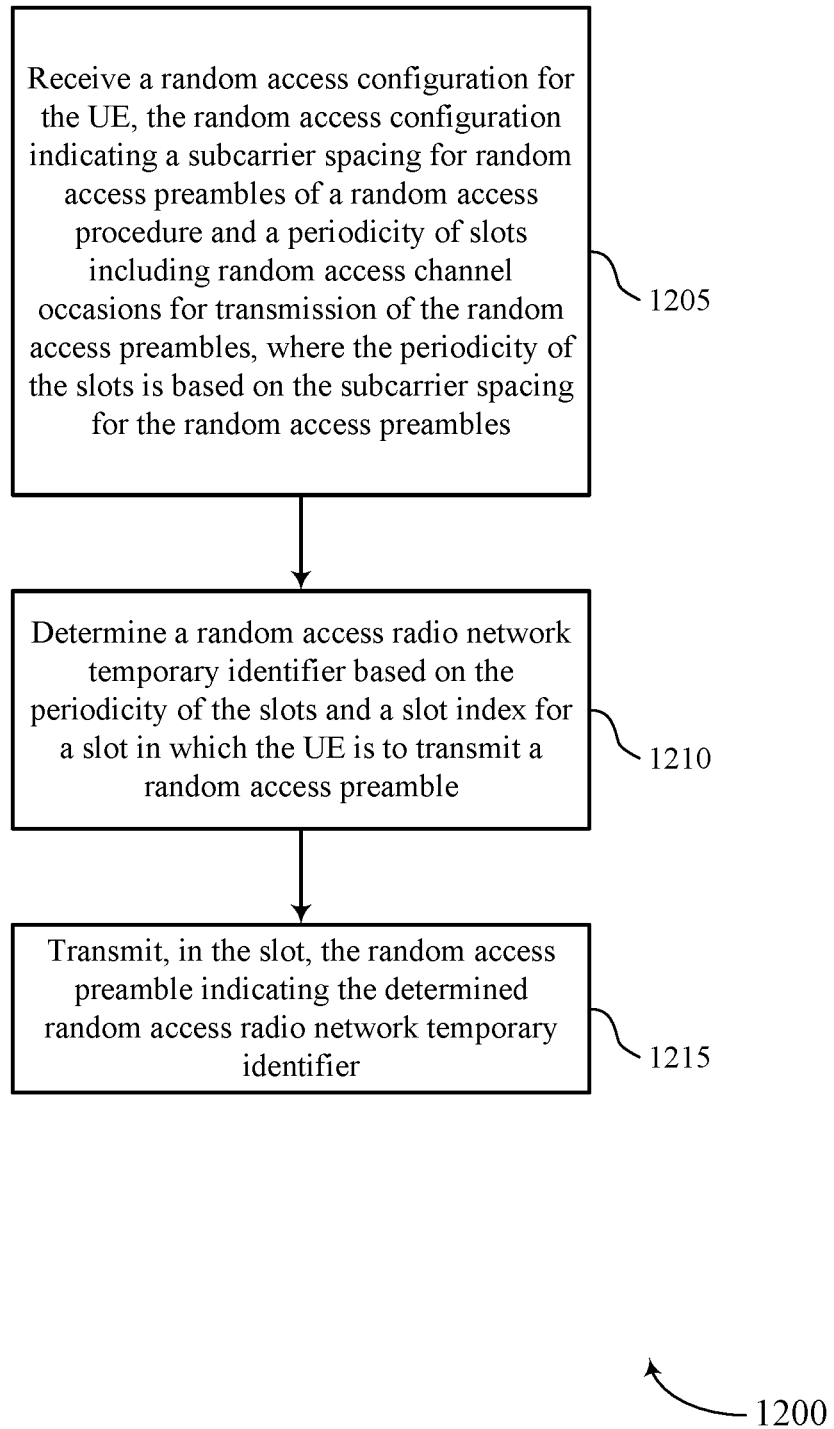
FIGS. 12 through 25 show flowcharts illustrating methods that support indicating system timing information in high band communications in accordance with aspects of the present disclosure.

FIG. 12 shows a flowchart illustrating a method 1200 that supports indicating system timing information in high band communications in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive a random access configuration for the UE, the random access configuration indicating a subcarrier spacing for random access preambles of a random access procedure and a periodicity of slots including random access channel occasions for transmission of the random access preambles, where the periodicity of the slots is based on the subcarrier spacing for the random access preambles. The operations of 1205 may be performed according to the methods described herein. In some examples, aspects of the operations of 1205 may be performed by a receive manager as described with reference to FIGS. 4 through 7.

At 1210, the UE may determine a RA-RNTI based on the periodicity of the slots and a slot index for a slot in which the UE is to transmit a random access preamble. The operations of 1210 may be performed according to the methods described herein. In some examples, aspects of the operations of 1210 may be performed by a determination manager as described with reference to FIGS. 4 through 7.

At 1215, the UE may transmit, in the slot, the random access preamble indicating the determined RA-RNTI. The operations of 1215 may be performed according to the methods described herein. In some examples, aspects of the operations of 1215 may be performed by a transmit manager as described with reference to FIGS. 4 through 7.

Figure 13:
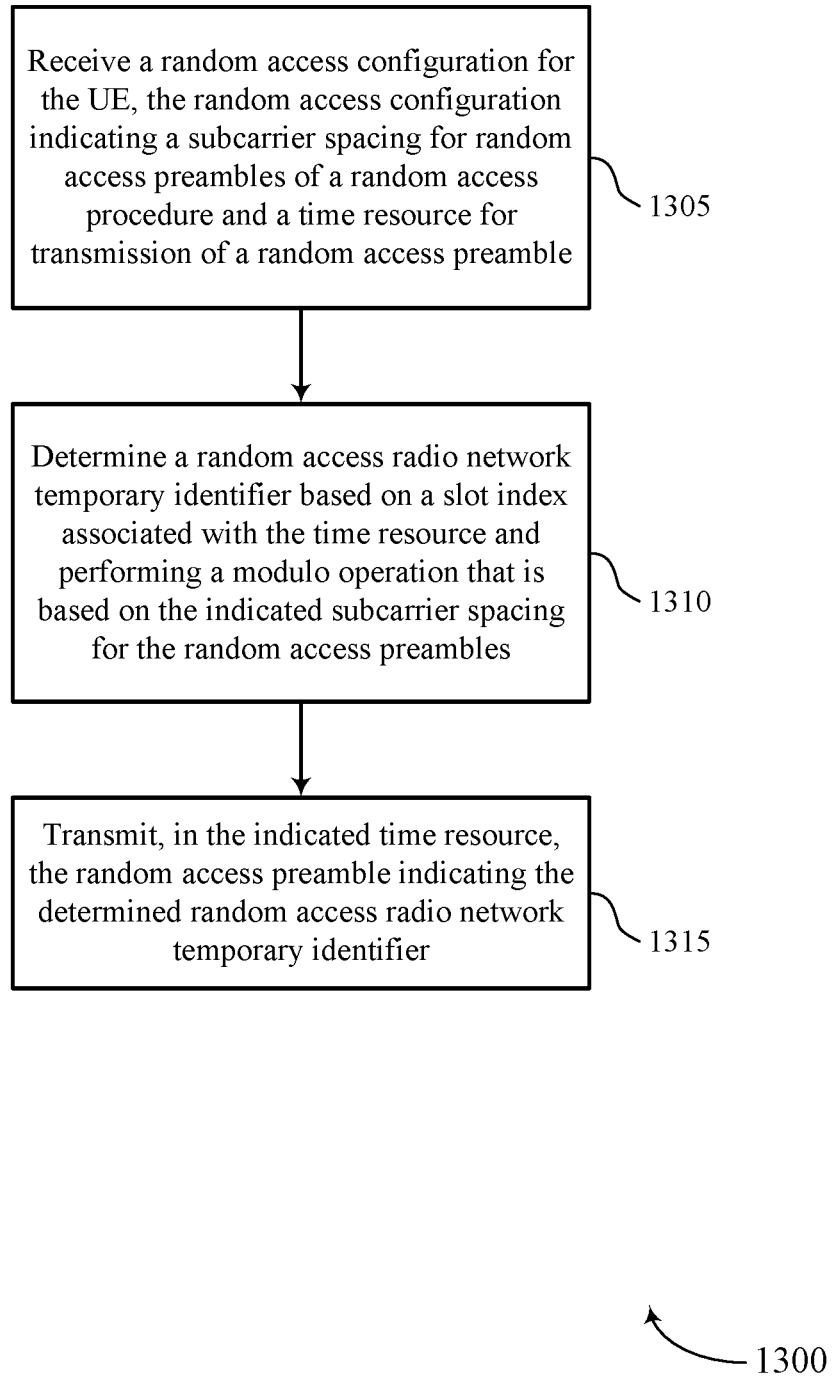

FIG. 13 shows a flowchart illustrating a method 1300 that supports indicating system timing information in high band communications in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below.

Additionally or alternatively, a UE may perform aspects of the functions described below using special-purpose hardware.

At 1305, the UE may receive a random access configuration for the UE, the random access configuration indicating a subcarrier spacing for random access preambles of a random access procedure and a time resource for transmission of a random access preamble. The operations of 1305 may be performed according to the methods described herein. In some examples, aspects of the operations of 1305 may be performed by a receive manager as described with reference to FIGS. 4 through 7.

At 1310, the UE may determine a RA-RNTI based on a slot index associated with the time resource and performing a modulo operation that is based on the indicated subcarrier spacing for the random access preambles. The operations of 1310 may be performed according to the methods described herein. In some examples, aspects of the operations of 1310 may be performed by a determination manager as described with reference to FIGS. 4 through 7.

At 1315, the UE may transmit, in the indicated time resource, the random access preamble indicating the determined RA-RNTI. The operations of 1315 may be performed according to the methods described herein. In some examples, aspects of the operations of 1315 may be performed by a transmit manager as described with reference to FIGS. 4 through 7.

Figure 14:
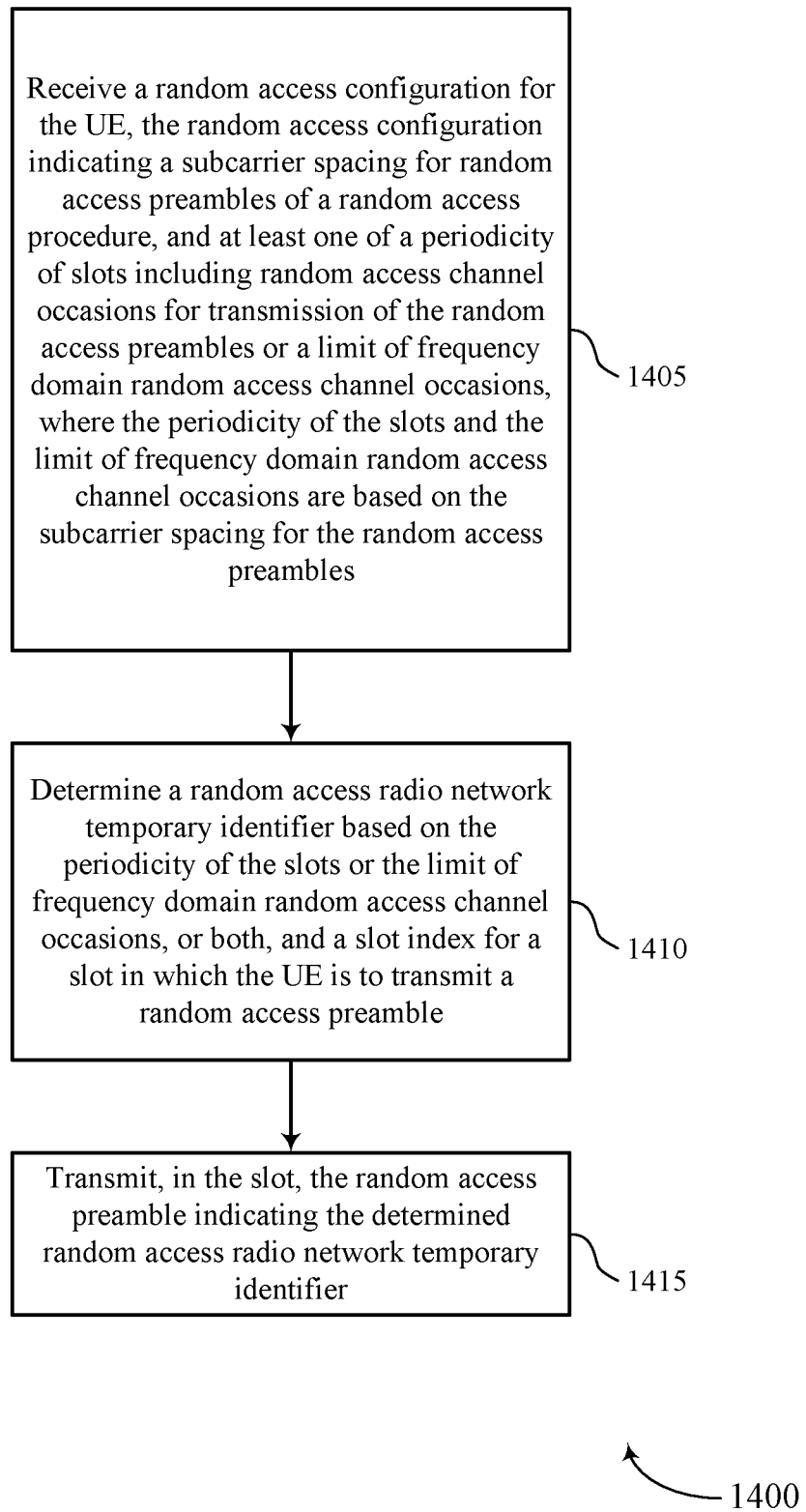

FIG. 14 shows a flowchart illustrating a method 1400 that supports indicating system timing information in high band communications in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may receive a random access configuration for the UE, the random access configuration indicating a subcarrier spacing for random access preambles of a random access procedure, and at least one of a periodicity of slots including random access channel occasions for transmission of the random access preambles or a limit of frequency domain random access channel occasions, where the periodicity of the slots and the limit of frequency domain random access channel occasions are based on the subcarrier spacing for the random access preambles. The operations of 1405 may be performed according to the methods described herein. In some examples, aspects of the operations of 1405 may be performed by a receive manager as described with reference to FIGS. 4 through 7.

At 1410, the UE may determine a RA-RNTI based on the periodicity of the slots or the limit of frequency domain random access channel occasions, or both, and a slot index for a slot in which the UE is to transmit a random access preamble. The operations of 1410 may be performed according to the methods described herein. In some examples, aspects of the operations of 1410 may be performed by a determination manager as described with reference to FIGS. 4 through 7.

At 1415, the UE may transmit, in the slot, the random access preamble indicating the determined RA-RNTI. The operations of 1415 may be performed according to the methods described herein. In some examples, aspects of the operations of 1415 may be performed by a transmit manager as described with reference to FIGS. 4 through 7.

Figure 15:
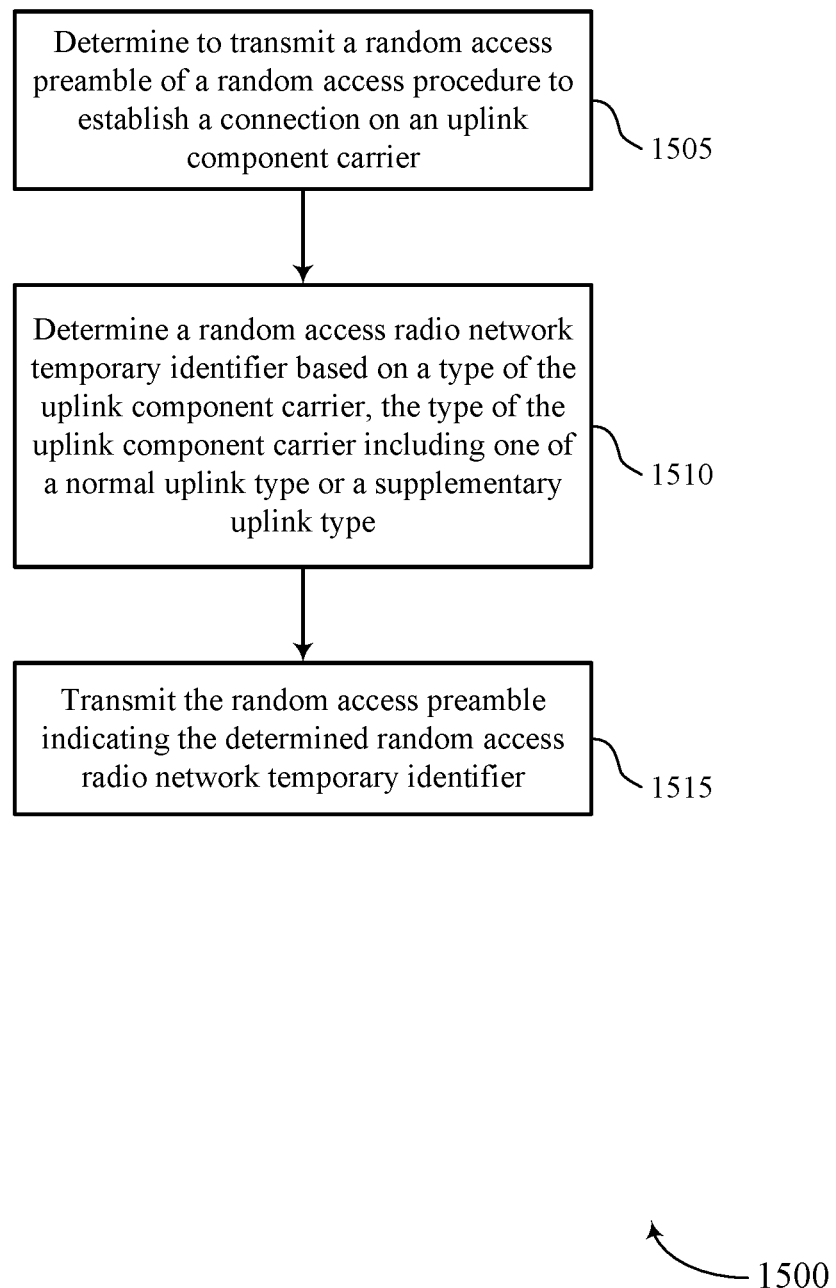

FIG. 15 shows a flowchart illustrating a method 1500 that supports indicating system timing information in high band communications in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE may determine to transmit a random access preamble of a random access procedure to establish a connection on an uplink component carrier. The operations of 1505 may be performed according to the methods described herein. In some examples, aspects of the operations of 1505 may be performed by a determination manager as described with reference to FIGS. 4 through 7.

At 1510, the UE may determine a RA-RNTI based on a type of the uplink component carrier, the type of the uplink component carrier including one of a normal uplink type or a supplementary uplink type. The operations of 1510 may be performed according to the methods described herein. In some examples, aspects of the operations of 1510 may be performed by a determination manager as described with reference to FIGS. 4 through 7.

At 1515, the UE may transmit the random access preamble indicating the determined RA-RNTI. The operations of 1515 may be performed according to the methods described herein. In some examples, aspects of the operations of 1515 may be performed by a transmit manager as described with reference to FIGS. 4 through 7.

Figure 16:
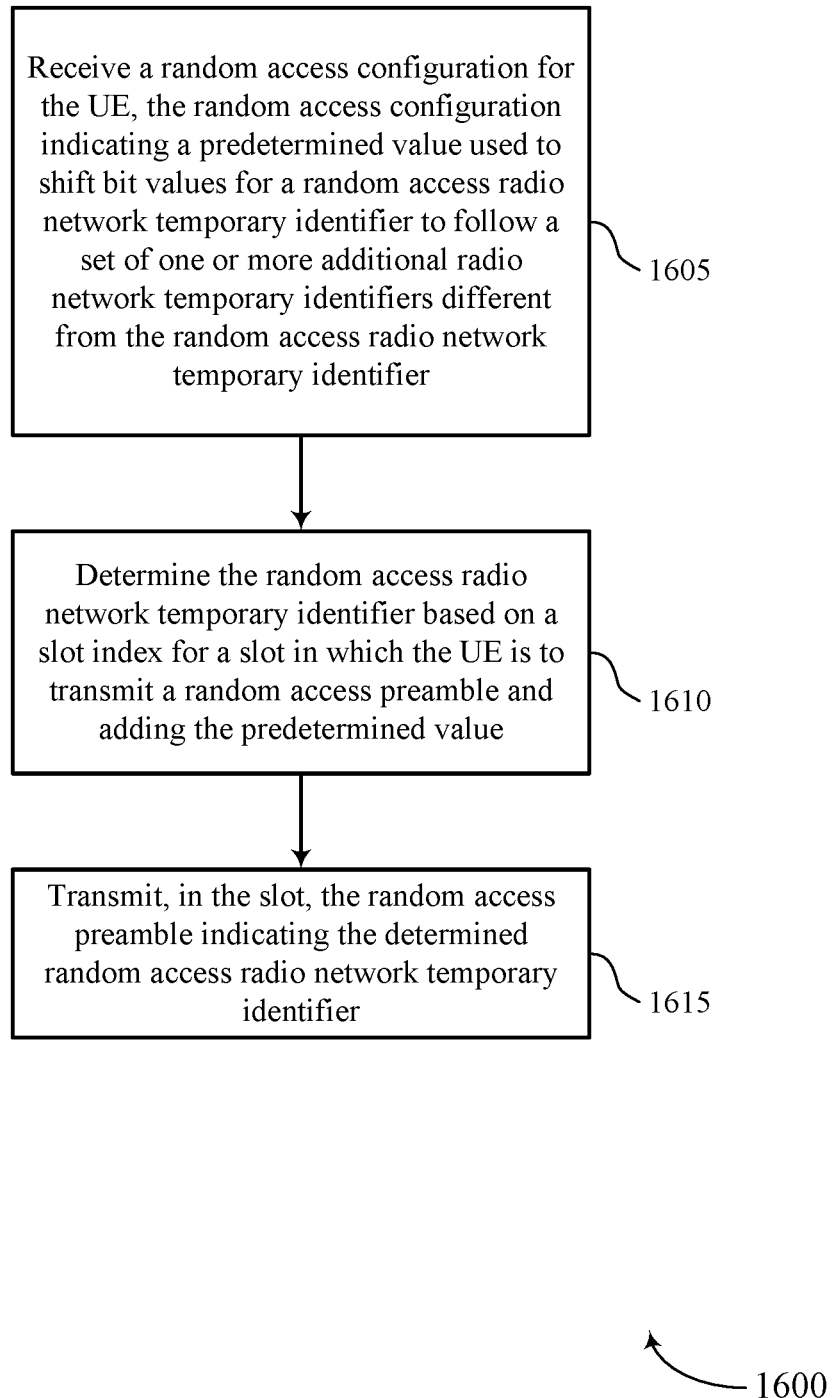

FIG. 16 shows a flowchart illustrating a method 1600 that supports indicating system timing information in high band communications in accordance with aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1605, the UE may receive a random access configuration for the UE, the random access configuration indicating a predetermined value used to shift bit values for a RA-RNTI to follow a set of one or more additional radio network temporary identifiers different from the RA-RNTI. The operations of 1605 may be performed according to the methods described herein. In some examples, aspects of the operations of 1605 may be performed by a receive manager as described with reference to FIGS. 4 through 7.

At 1610, the UE may determine the RA-RNTI based on a slot index for a slot in which the UE is to transmit a random access preamble and adding the predetermined value. The operations of 1610 may be performed according to the methods described herein. In some examples, aspects of the operations of 1610 may be performed by a determination manager as described with reference to FIGS. 4 through 7.

At 1615, the UE may transmit, in the slot, the random access preamble indicating the determined RA-RNTI. The operations of 1615 may be performed according to the methods described herein. In some examples, aspects of the operations of 1615 may be performed by a transmit manager as described with reference to FIGS. 4 through 7.

Figure 17:
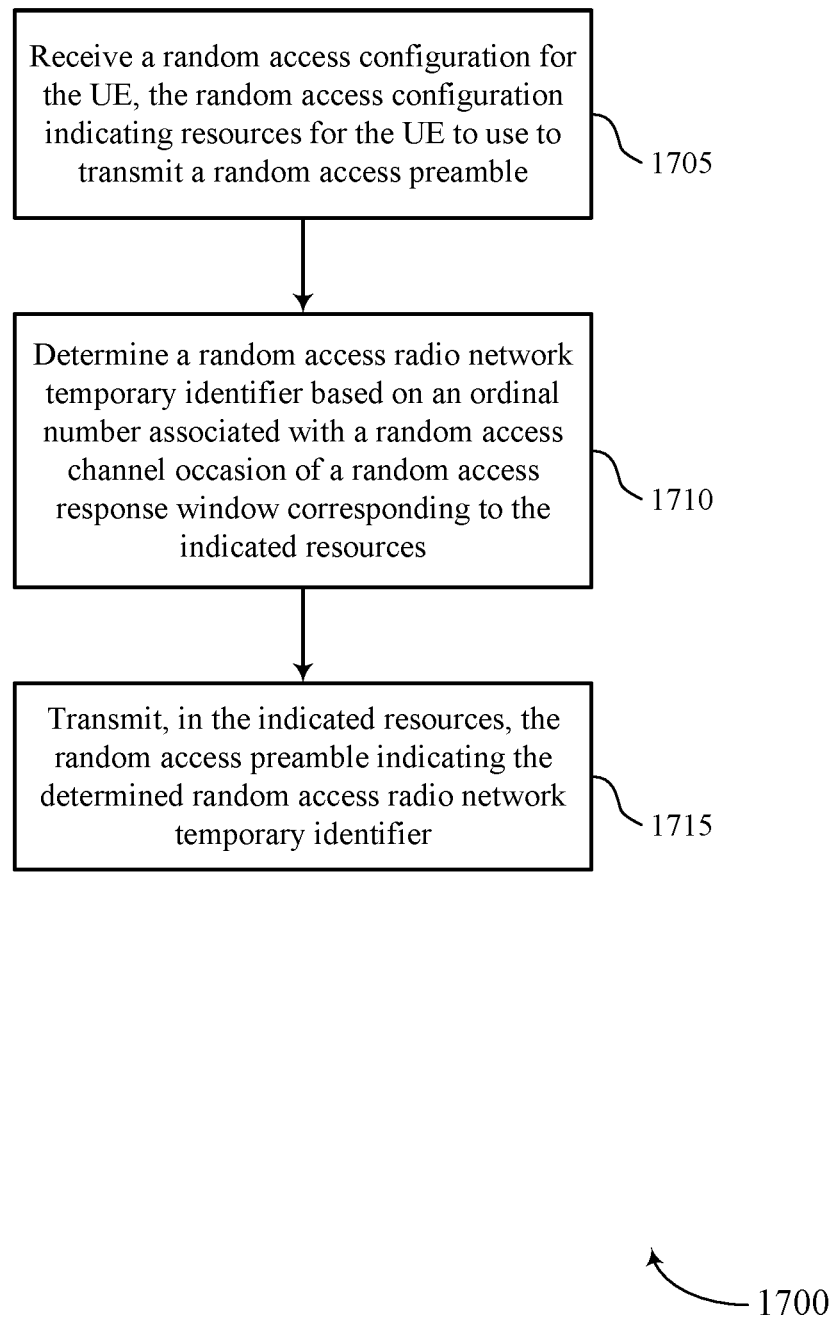

FIG. 17 shows a flowchart illustrating a method 1700 that supports indicating system timing information in high band communications in accordance with aspects of the present disclosure. The operations of method 1700 may be implemented by a UE 115 or its components as described herein. For example, the operations of method 1700 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1705, the UE may receive a random access configuration for the UE, the random access configuration indicating resources for the UE to use to transmit a random access preamble. The operations of 1705 may be performed according to the methods described herein. In some examples, aspects of the operations of 1705 may be performed by a receive manager as described with reference to FIGS. 4 through 7.

At 1710, the UE may determine a RA-RNTI based on an ordinal number associated with a random access channel occasion of a random access response window corresponding to the indicated resources. The operations of 1710 may be performed according to the methods described herein. In some examples, aspects of the operations of 1710 may be performed by a determination manager as described with reference to FIGS. 4 through 7.

At 1715, the UE may transmit, in the indicated resources, the random access preamble indicating the determined RA-RNTI. The operations of 1715 may be performed according to the methods described herein. In some examples, aspects of the operations of 1715 may be performed by a transmit manager as described with reference to FIGS. 4 through 7.

Figure 18:
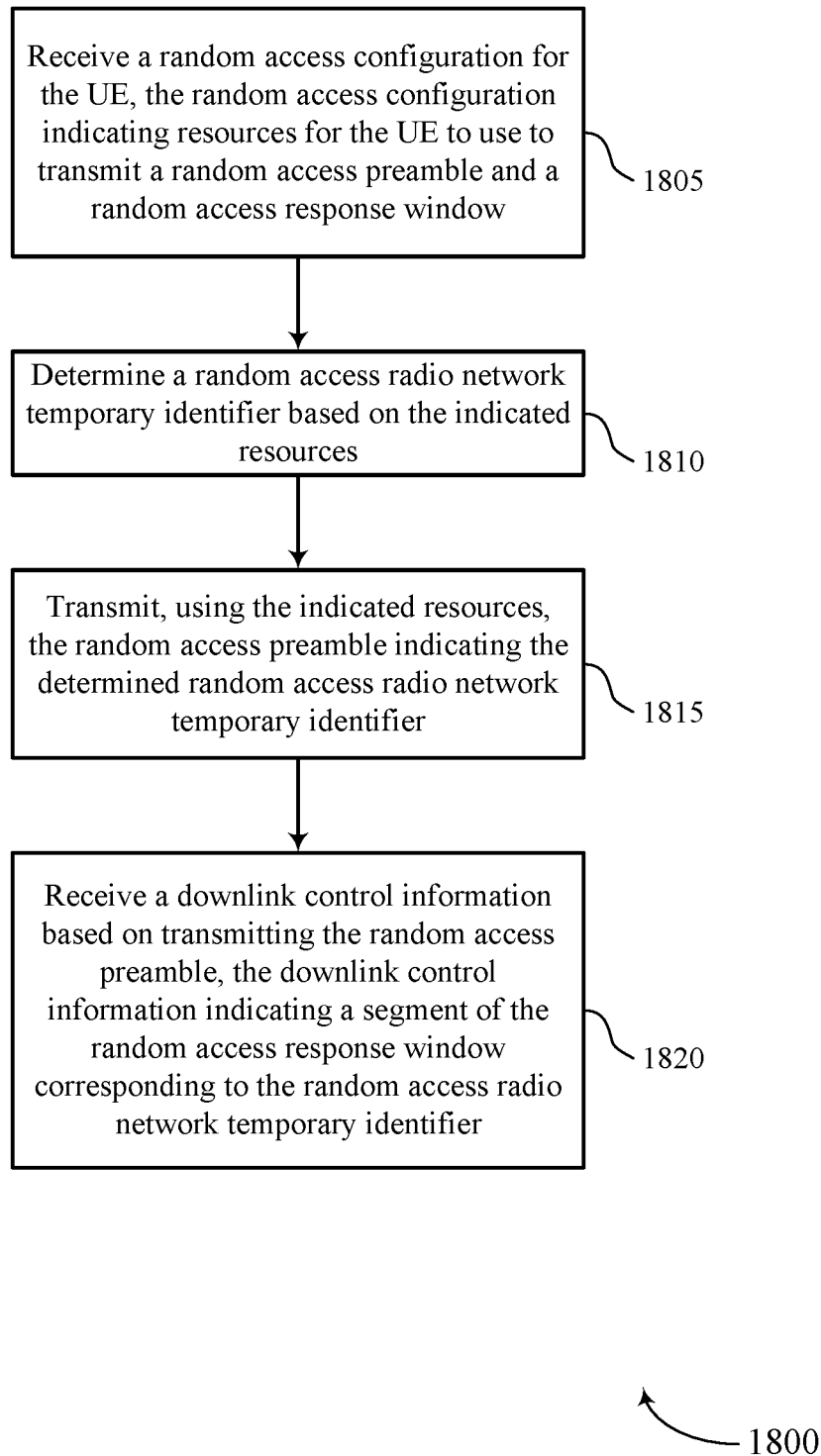

FIG. 18 shows a flowchart illustrating a method 1800 that supports indicating system timing information in high band communications in accordance with aspects of the present disclosure. The operations of method 1800 may be implemented by a UE 115 or its components as described herein. For example, the operations of method 1800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1805, the UE may receive a random access configuration for the UE, the random access configuration indicating resources for the UE to use to transmit a random access preamble and a random access response window. The operations of 1805 may be performed according to the methods described herein. In some examples, aspects of the operations of 1805 may be performed by a receive manager as described with reference to FIGS. 4 through 7.

At 1810, the UE may determine a RA-RNTI based on the indicated resources. The operations of 1810 may be performed according to the methods described herein. In some examples, aspects of the operations of 1810 may be performed by a determination manager as described with reference to FIGS. 4 through 7.

At 1815, the UE may transmit, using the indicated resources, the random access preamble indicating the determined RA-RNTI. The operations of 1815 may be performed according to the methods described herein. In some examples, aspects of the operations of 1815 may be performed by a transmit manager as described with reference to FIGS. 4 through 7.

At 1820, the UE may receive a downlink control information based on transmitting the random access preamble, the downlink control information indicating a segment of the random access response window corresponding to the RA-RNTI. The operations of 1820 may be performed according to the methods described herein. In some examples, aspects of the operations of 1820 may be performed by a receive manager as described with reference to FIGS. 4 through 7.

Figure 19:
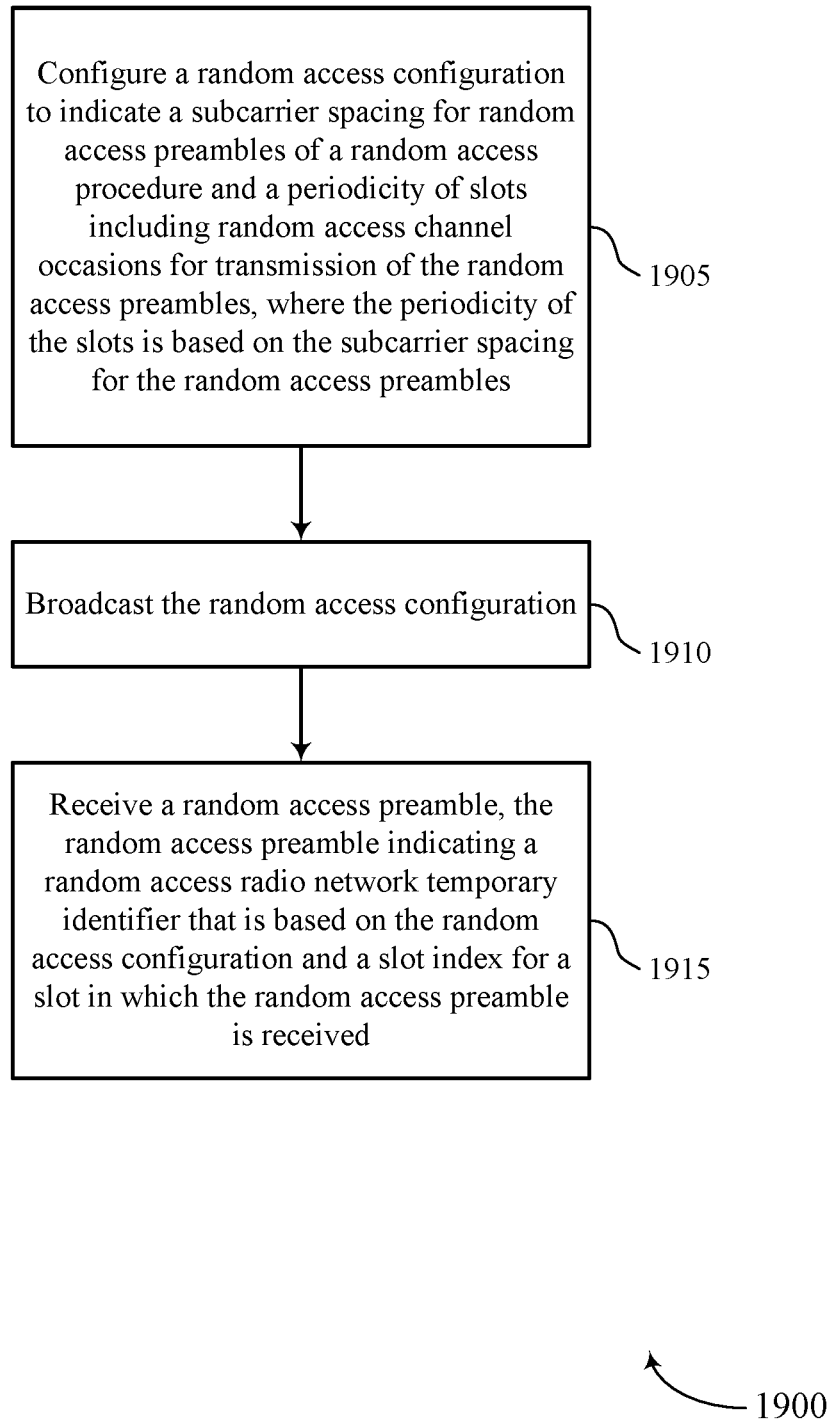

FIG. 19 shows a flowchart illustrating a method 1900 that supports indicating system timing information in high band communications in accordance with aspects of the present disclosure. The operations of method 1900 may be implemented by a base station 105 or its components as described herein. For example, the operations of method 1900 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1905, the base station may configure a random access configuration to indicate a subcarrier spacing for random access preambles of a random access procedure and a periodicity of slots including random access channel occasions for transmission of the random access preambles, where the periodicity of the slots is based on the subcarrier spacing for the random access preambles. The operations of 1905 may be performed according to the methods described herein. In some examples, aspects of the operations of 1905 may be performed by a configuration manager as described with reference to FIGS. 8 through 11.

At 1910, the base station may broadcast the random access configuration. The operations of 1910 may be performed according to the methods described herein. In some examples, aspects of the operations of 1910 may be performed by a media manager as described with reference to FIGS. 8 through 11.

At 1915, the base station may receive a random access preamble, the random access preamble indicating a RA-RNTI that is based on the random access configuration and a slot index for a slot in which the random access preamble is received. The operations of 1915 may be performed according to the methods described herein. In some examples, aspects of the operations of 1915 may be performed by a media manager as described with reference to FIGS. 8 through 11.

Figure 20:
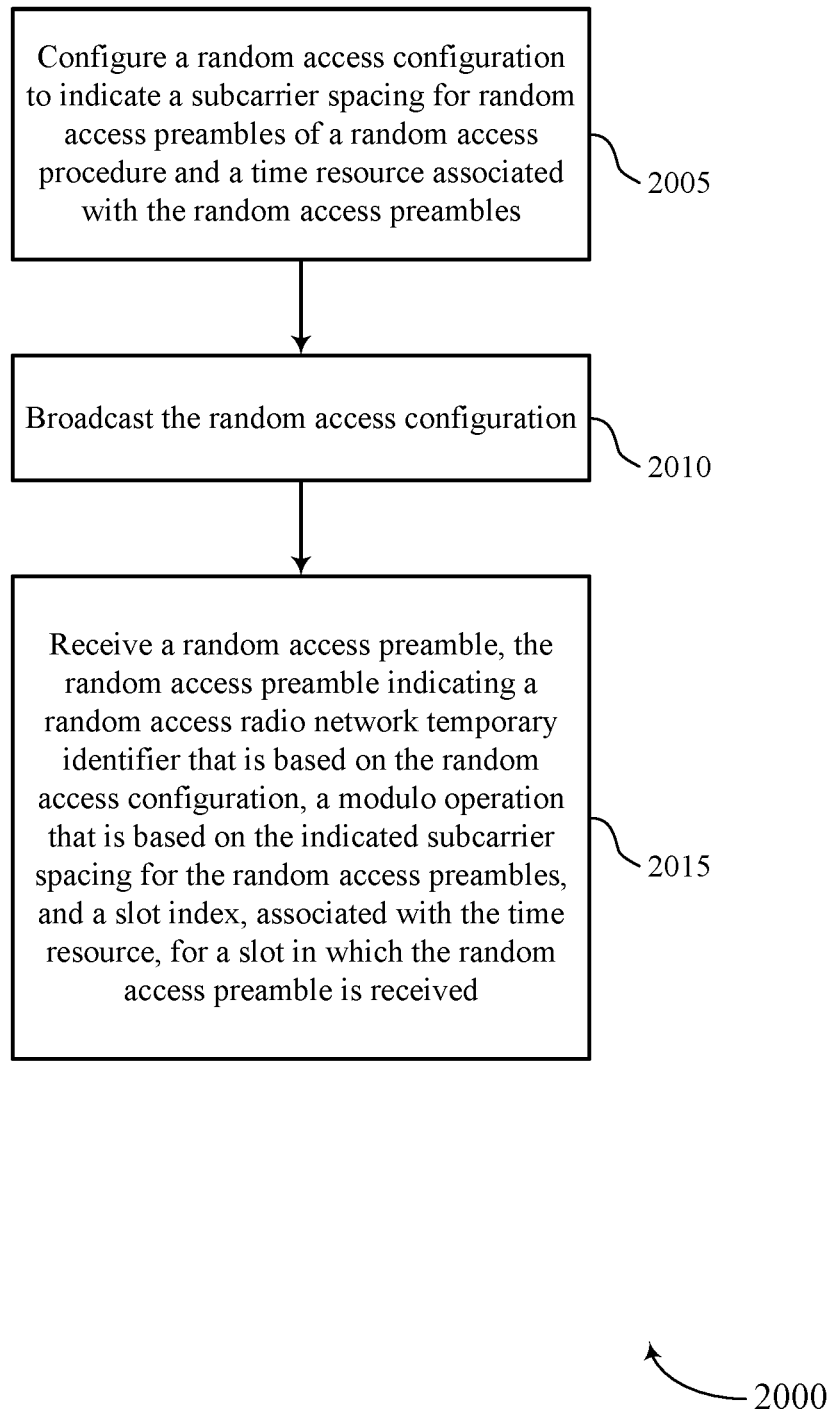

FIG. 20 shows a flowchart illustrating a method 2000 that supports indicating system timing information in high band communications in accordance with aspects of the present disclosure. The operations of method 2000 may be implemented by a base station 105 or its components as described herein. For example, the operations of method 2000 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 2005, the base station may configure a random access configuration to indicate a subcarrier spacing for random access preambles of a random access procedure and a time resource associated with the random access preambles. The operations of 2005 may be performed according to the methods described herein. In some examples, aspects of the operations of 2005 may be performed by a configuration manager as described with reference to FIGS. 8 through 11.

At 2010, the base station may broadcast the random access configuration. The operations of 2010 may be performed according to the methods described herein. In some examples, aspects of the operations of 2010 may be performed by a transmitting manager as described with reference to FIGS. 8 through 11.

At 2015, the base station may receive a random access preamble, the random access preamble indicating a RA-RNTI that is based on the random access configuration, a modulo operation that is based on the indicated subcarrier spacing for the random access preambles, and a slot index, associated with the time resource, for a slot in which the random access preamble is received. The operations of 2015 may be performed according to the methods described herein. In some examples, aspects of the operations of 2015 may be performed by a receiving manager as described with reference to FIGS. 8 through 11.

Figure 21:
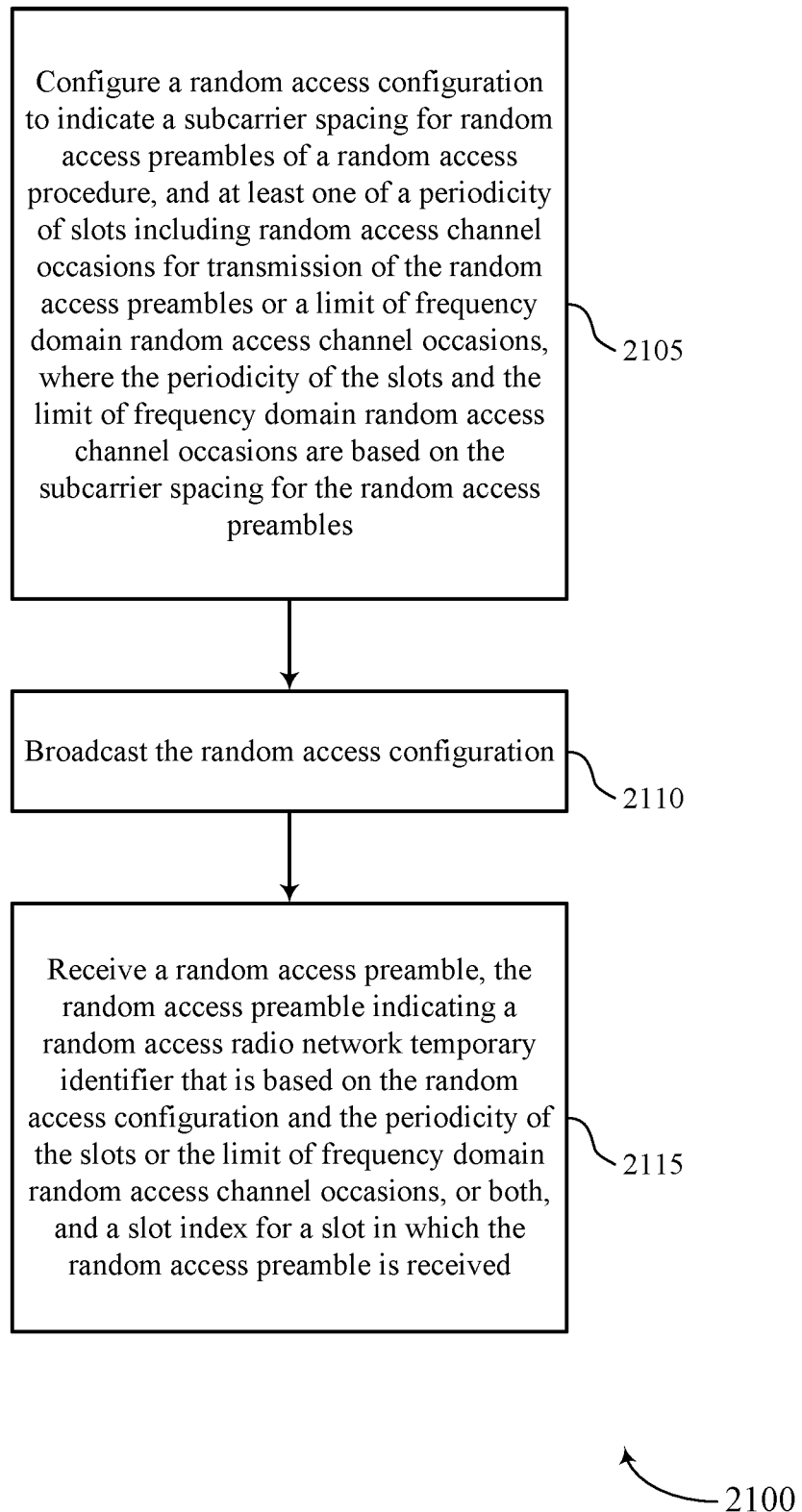

FIG. 21 shows a flowchart illustrating a method 2100 that supports indicating system timing information in high band communications in accordance with aspects of the present disclosure. The operations of method 2100 may be implemented by a base station 105 or its components as described herein. For example, the operations of method 2100 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 2105, the base station may configure a random access configuration to indicate a subcarrier spacing for random access preambles of a random access procedure, and at least one of a periodicity of slots including random access channel occasions for transmission of the random access preambles or a limit of frequency domain random access channel occasions, where the periodicity of the slots and the limit of frequency domain random access channel occasions are based on the subcarrier spacing for the random access preambles. The operations of 2105 may be performed according to the methods described herein. In some examples, aspects of the operations of 2105 may be performed by a configuration manager as described with reference to FIGS. 8 through 11.

At 2110, the base station may broadcast the random access configuration. The operations of 2110 may be performed according to the methods described herein. In some examples, aspects of the operations of 2110 may be performed by a transmitting manager as described with reference to FIGS. 8 through 11.

At 2115, the base station may receive a random access preamble, the random access preamble indicating a RA-RNTI that is based on the random access configuration and the periodicity of the slots or the limit of frequency domain random access channel occasions, or both, and a slot index for a slot in which the random access preamble is received. The operations of 2115 may be performed according to the methods described herein. In some examples, aspects of the operations of 2115 may be performed by a receiving manager as described with reference to FIGS. 8 through 11.

Figure 22:
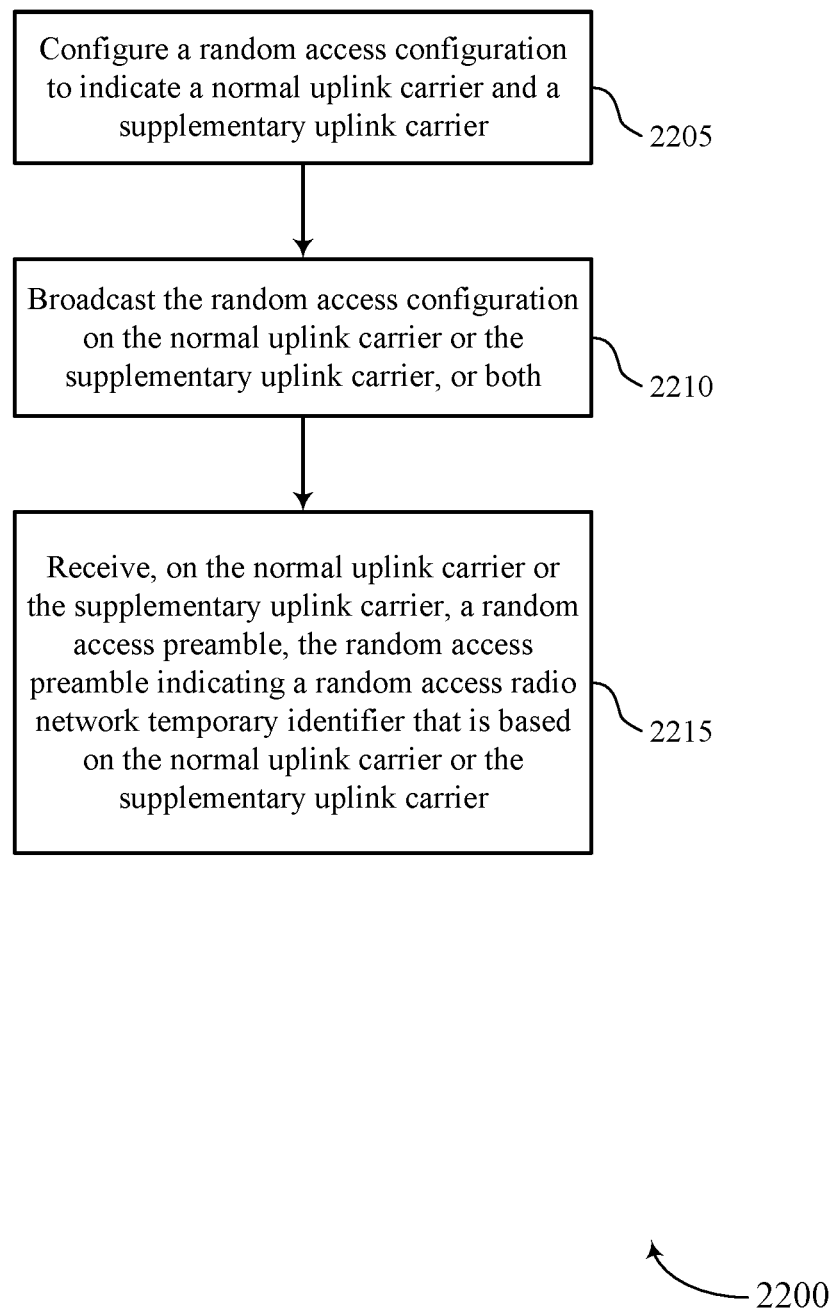

FIG. 22 shows a flowchart illustrating a method 2200 that supports indicating system timing information in high band communications in accordance with aspects of the present disclosure. The operations of method 2200 may be implemented by a base station 105 or its components as described herein. For example, the operations of method 2200 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 2205, the base station may configure a random access configuration to indicate a normal uplink carrier and a supplementary uplink carrier. The operations of 2205 may be performed according to the methods described herein. In some examples, aspects of the operations of 2205 may be performed by a configuration manager as described with reference to FIGS. 8 through 11.

At 2210, the base station may broadcast the random access configuration on the normal uplink carrier or the supplementary uplink carrier, or both. The operations of 2210 may be performed according to the methods described herein. In some examples, aspects of the operations of 2210 may be performed by a transmitting manager as described with reference to FIGS. 8 through 11.

At 2215, the base station may receive, on the normal uplink carrier or the supplementary uplink carrier, a random access preamble, the random access preamble indicating a RA-RNTI that is based on the normal uplink carrier or the supplementary uplink carrier. The operations of 2215 may be performed according to the methods described herein. In some examples, aspects of the operations of 2215 may be performed by a receiving manager as described with reference to FIGS. 8 through 11.

Figure 23:
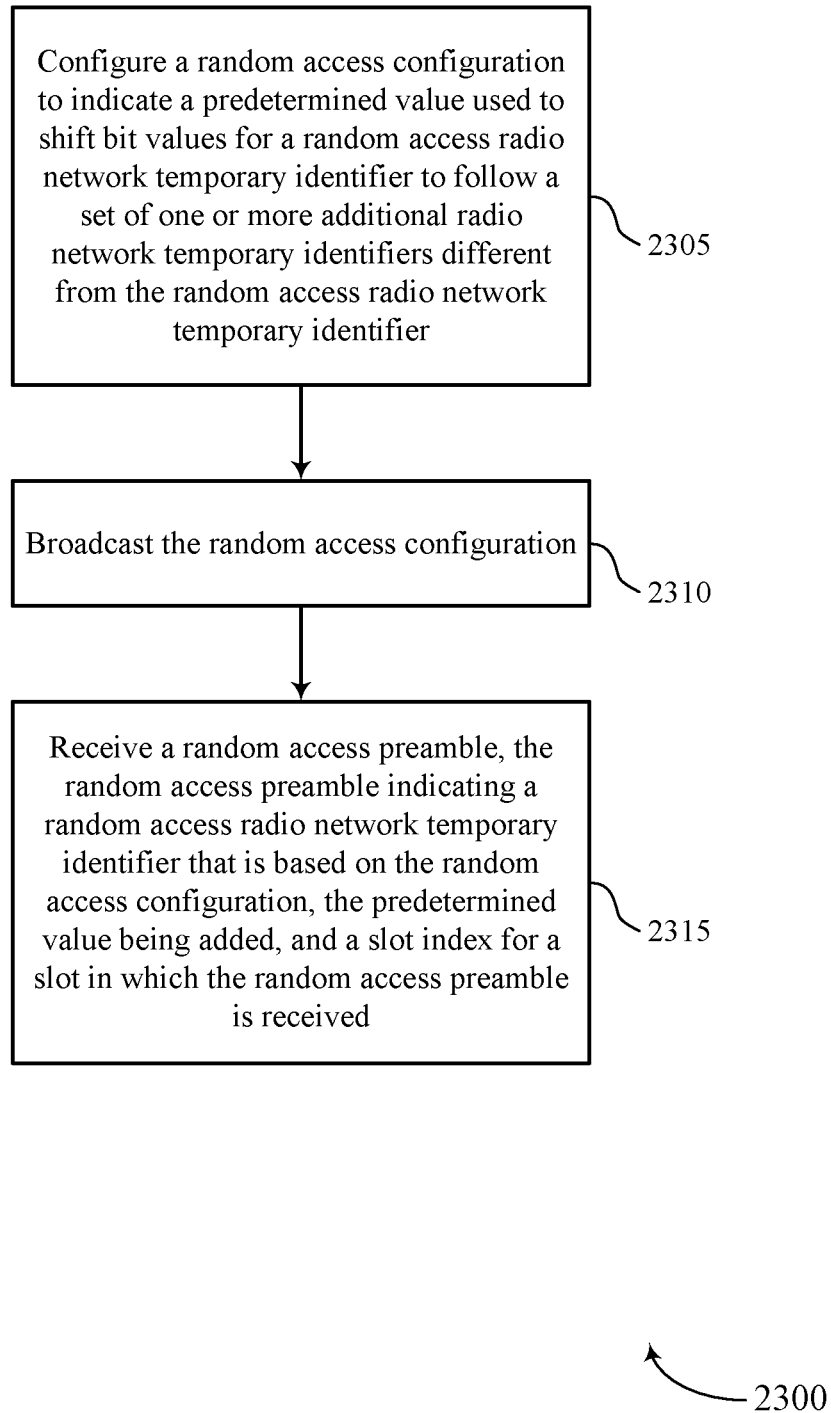

FIG. 23 shows a flowchart illustrating a method 2300 that supports indicating system timing information in high band communications in accordance with aspects of the present disclosure. The operations of method 2300 may be implemented by a base station 105 or its components as described herein. For example, the operations of method 2300 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 2305, the base station may configure a random access configuration to indicate a predetermined value used to shift bit values for a RA-RNTI to follow a set of one or more additional radio network temporary identifiers different from the RA-RNTI. The operations of 2305 may be performed according to the methods described herein. In some examples, aspects of the operations of 2305 may be performed by a configuration manager as described with reference to FIGS. 8 through 11.

At 2310, the base station may broadcast the random access configuration. The operations of 2310 may be performed according to the methods described herein. In some examples, aspects of the operations of 2310 may be performed by a transmitting manager as described with reference to FIGS. 8 through 11.

At 2315, the base station may receive a random access preamble, the random access preamble indicating a RA-RNTI that is based on the random access configuration, the predetermined value being added, and a slot index for a slot in which the random access preamble is received. The operations of 2315 may be performed according to the methods described herein. In some examples, aspects of the operations of 2315 may be performed by a receiving manager as described with reference to FIGS. 8 through 11.

Figure 24:
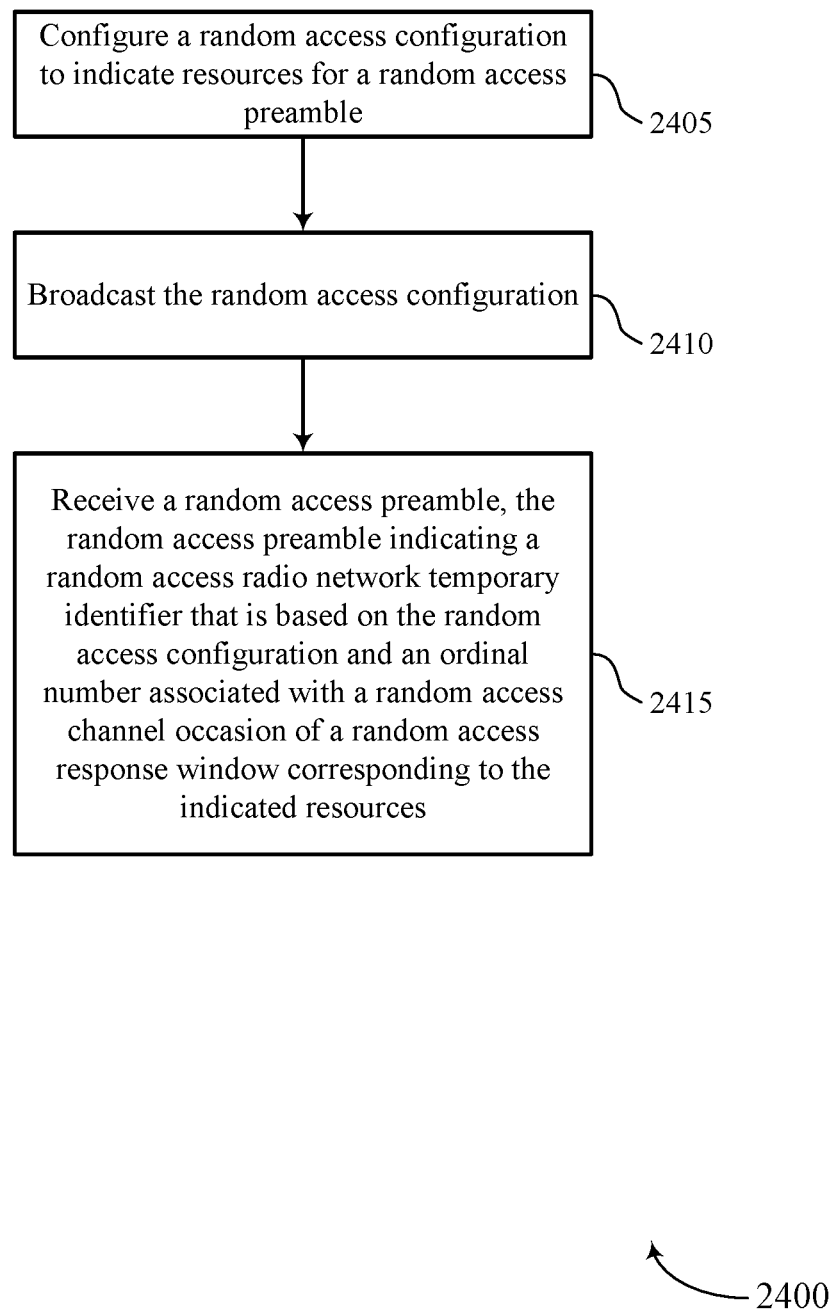

FIG. 24 shows a flowchart illustrating a method 2400 that supports indicating system timing information in high band communications in accordance with aspects of the present disclosure. The operations of method 2400 may be implemented by a base station 105 or its components as described herein. For example, the operations of method 2400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 2405, the base station may configure a random access configuration to indicate resources for a random access preamble. The operations of 2405 may be performed according to the methods described herein. In some examples, aspects of the operations of 2405 may be performed by a configuration manager as described with reference to FIGS. 8 through 11.

At 2410, the base station may broadcast the random access configuration. The operations of 2410 may be performed according to the methods described herein. In some examples, aspects of the operations of 2410 may be performed by a transmitting manager as described with reference to FIGS. 8 through 11.

At 2415, the base station may receive a random access preamble, the random access preamble indicating a RA-RNTI that is based on the random access configuration and an ordinal number associated with a random access channel occasion of a random access response window corresponding to the indicated resources. The operations of 2415 may be performed according to the methods described herein. In some examples, aspects of the operations of 2415 may be performed by receiver and/or communications manager as described with reference to FIGS. 8 through 11.

Figure 25:
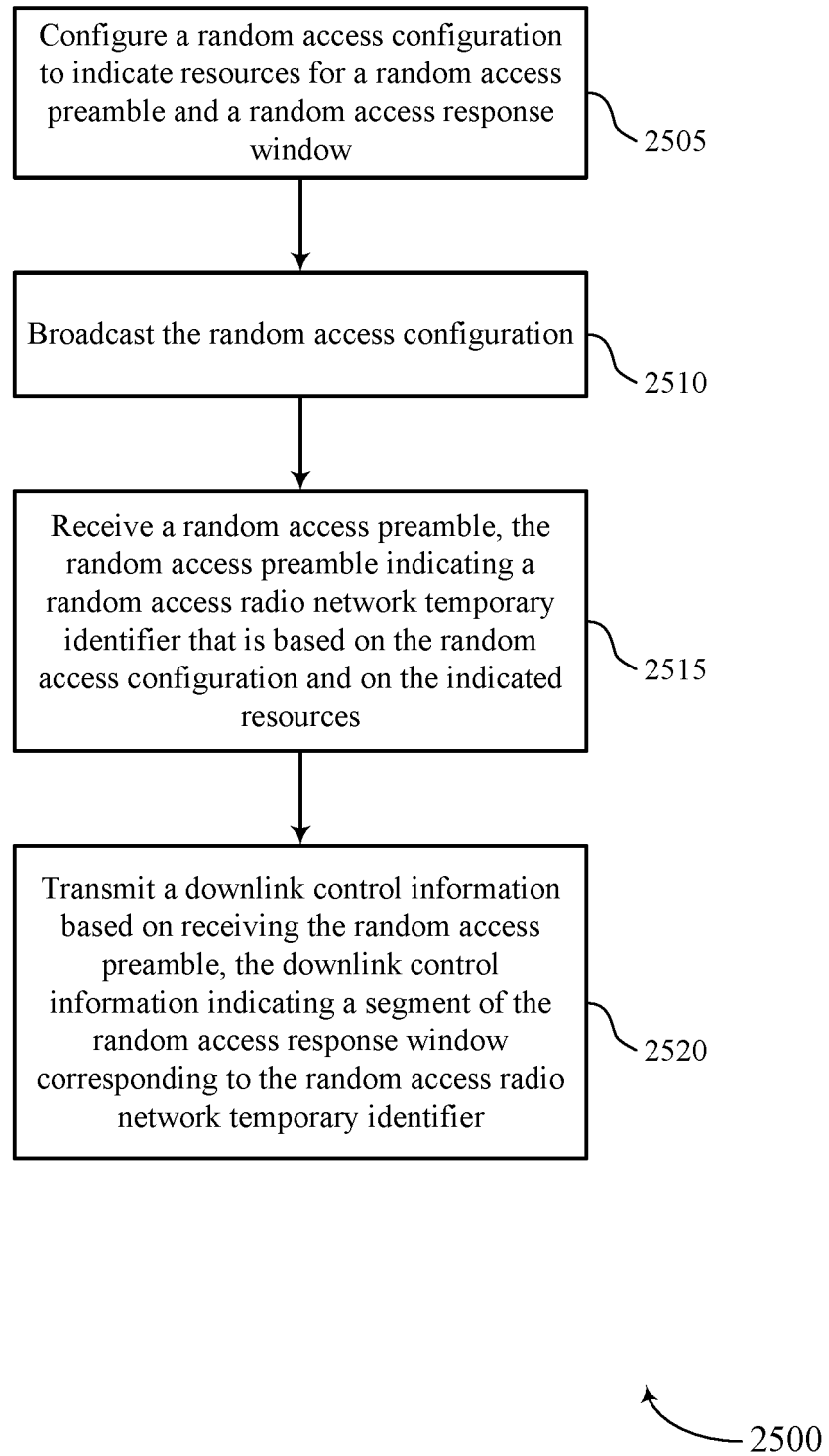

FIG. 25 shows a flowchart illustrating a method 2500 that supports indicating system timing information in high band communications in accordance with aspects of the present disclosure. The operations of method 2500 may be implemented by a base station 105 or its components as described herein. For example, the operations of method 2500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 2505, the base station may configure a random access configuration to indicate resources for a random access preamble and a random access response window. The operations of 2505 may be performed according to the methods described herein. In some examples, aspects of the operations of 2505 may be performed by a configuration manager as described with reference to FIGS. 8 through 11.

At 2510, the base station may broadcast the random access configuration. The operations of 2510 may be performed according to the methods described herein. In some examples, aspects of the operations of 2510 may be performed by a transmitting manager as described with reference to FIGS. 8 through 11.

At 2515, the base station may receive a random access preamble, the random access preamble indicating a RA-RNTI that is based on the random access configuration and on the indicated resources. The operations of 2515 may be performed according to the methods described herein. In some examples, aspects of the operations of 2515 may be performed by a receiving manager as described with reference to FIGS. 8 through 11.

At 2520, the base station may transmit a downlink control information based on receiving the random access preamble, the downlink control information indicating a segment of the random access response window corresponding to the RA-RNTI. The operations of 2520 may be performed according to the methods described herein. In some examples, aspects of the operations of 2520 may be performed by a transmitting manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving a random access configuration for the UE, the random access configuration indicating resources for the UE to use to transmit a random access preamble and indicating a random access response window; determining a random access radio network temporary identifier based at least in part on the indicated resources; transmitting, using the indicated resources, the random access preamble indicating the determined random access radio network temporary identifier; and receiving a downlink control information based at least in part on transmitting the random access preamble, the downlink control information indicating a segment of the random access response window corresponding to the random access radio network temporary identifier.

Aspect 2: The method of aspect 1, wherein the downlink control information indicates X bits that indicate the segment, X is a positive integer.

Aspect 3: The method of aspect 2, wherein the random access response window includes at least a 10 millisecond window, and each segment is less than 10 milliseconds.

Aspect 4: The method of any of aspects 2 through 3, further comprising: determining, based at least in part on a subcarrier spacing for the random access preamble, a quantity of the X bits that indicate the segment.

Aspect 5: The method of any of aspects 1 through 4, further comprising: determining, based at least in part on the downlink control information message, resources of the segment for the UE to use to receive a random access response message in the segment; and receiving the random access response message on the resources of the segment.

Aspect 6: The method of any of aspects 1 through 5, wherein a duration of the segment is less than a duration of a system frame.

Aspect 7: A method for wireless communications at a base station, comprising: configuring a random access configuration to indicate resources for a random access preamble and to indicate a random access response window; broadcasting the random access configuration; receiving a random access preamble, the random access preamble indicating a random access radio network temporary identifier that is based at least in part on the random access configuration and on the indicated resources; and transmitting a downlink control information based at least in part on receiving the random access preamble, the downlink control information indicating a segment of the random access response window corresponding to the random access radio network temporary identifier.

Aspect 8: The method of aspect 7, wherein the downlink control information indicates X bits that indicate the segment, X is a positive integer.

Aspect 9: The method of aspect 8, wherein the random access response window includes at least a 10 millisecond window, and each segment is less than 10 milliseconds.

Aspect 10: The method of any of aspects 8 through 9, further comprising: configuring, based at least in part on a subcarrier spacing for the random access preamble, a quantity of the X bits to indicate the segment.

Aspect 11: The method of any of aspects 7 through 10, further comprising: configuring the downlink control information to include resources of the segment for the UE to use to receive a random access response message in the segment; and transmitting the random access response message on the resources of the segment.

Aspect 12: The method of aspect 11, wherein a duration of the segment is less than a duration of a system frame.

Aspect 13: A method for wireless communications at a UE, comprising: receiving a random access configuration for the UE, the random access configuration indicating a subcarrier spacing for random access preambles of a random access procedure and time-frequency resources comprising random access channel occasions for transmission of the random access preambles, wherein the time-frequency resources are based at least in part on the subcarrier spacing for the random access preambles; determining a random access radio network temporary identifier based at least in part on the time-frequency resources and a slot index for a slot in which the UE is to transmit a random access preamble; and transmitting, in the slot, the random access preamble indicating the determined random access radio network temporary identifier.

Aspect 14: The method of aspect 13, wherein the time-frequency resources comprising the random access channel occasions comprise a periodicity of slots comprising the random access channel occasions, wherein determining the random access radio network temporary identifier is based at least in part on the periodicity of slots and the slot index.

Aspect 15: The method of any of aspects 13 through 14, wherein a periodicity of slots comprising the random access channel occasions is based at least in part on the random access channel occasions being allocated every N slots for the subcarrier spacing, N is a positive integer greater than 1, and the subcarrier spacing comprises a N*120 kilohertz subcarrier spacing, and a range of the slot index of the random access radio network temporary identifier ranges from zero to a value determined based at least in part on a floor operation, the floor operation performed on a ration of the slot index to N.

Aspect 16: The method of aspect 15, wherein the subcarrier spacing comprises a N*120 kilohertz subcarrier spacing, and a range of the slot index of the random access radio network temporary identifier ranges from zero to a value determined based at least in part on a floor operation, the floor operation performed on a ratio of the slot index to N.

Aspect 17: The method of any of aspects 13 through 16, wherein the time-frequency resources comprising the random access channel occasions comprise a time resource for transmission of a random access preamble in the random access channel occasions, wherein determining the random access radio network temporary identifier is based at least in part on the time resource and performing a modulo operation that is based at least in part on the indicated subcarrier spacing for the random access preambles.

Aspect 18: The method of any of aspects 13 through 17, further comprising: determining that the random access radio network temporary identifier collides with a previously determined random access radio network temporary identifier, or collides with a reserved value from a reserved range of values, or collides with a pre-allocated random access radio network temporary identifier; and marking the random access radio network temporary identifier as invalid based at least in part on the determining.

Aspect 19: The method of aspect 18, wherein the pre-allocated random access radio network temporary identifier includes a paging random access radio network temporary identifier or a system information random access radio network temporary identifier.

Aspect 20: The method of any of aspects 13 through 19, wherein a slot index ranges from zero to N*80 for a subcarrier spacing of N*120 kilohertz and a random access response window is M milliseconds, N is a positive integer greater than 1 and M is a positive integer that ranges from 1 to 40.

Aspect 21: The method of any of aspects 13 through 20, wherein the time-frequency resources comprising the random access channel occasions comprise at least one of a periodicity of slots comprising the random access channel occasions for transmission for the random access preambles or a limit of frequency domain random access channel occasions, wherein determining the random access radio network temporary identifier is based at least in part on the at least one of the periodicity of slots or the limit of frequency domain random access channel occasions, wherein a number of frequency domain random access channel occasions is 1 or 2 when the subcarrier spacing is 960 kilohertz and an uplink carrier identifier is set to 1, or wherein a number of frequency domain random access channel occasions is between zero and 4 when the subcarrier spacing is 960 kilohertz and an uplink carrier identifier is set to 1, or the uplink carrier identifier is set to zero and a periodicity of slots comprising the random access channel occasions is set to every other slot.

Aspect 22: The method of any of aspects 13 through 21, wherein the random access configuration indicates an extension of the slot index based at least in part on the subcarrier spacing for the random access preambles.

Aspect 23: The method of any of aspects 13 through 22, wherein a number of frequency domain random access channel occasions is between zero and 4, and a number of time domain random access channel occasions by allocating the random access channel occasions every other slot when the number of frequency domain random access channel occasions is between zero and 4, and a slot index ranges from zero to 320 when the number of frequency domain random access channel occasions are between zero and 4 and an uplink carrier identifier is set to 1.

Aspect 24: The method of any of aspects 13 through 23, wherein a number of frequency domain random access channel occasions is between zero and 4 when an uplink carrier identifier is set to zero, a slot index ranges from zero to 640 when the number of frequency domain random access channel occasions are limited between zero and 4 and the uplink carrier identifier is set to zero, and the number of frequency domain random access channel occasions are between zero and 4 when the subcarrier spacing is 960 kilohertz and the uplink carrier identifier is set to zero.

Aspect 25: A method for wireless communications at a base station, comprising: configuring a random access configuration for the UE, the random access configuration indicating a subcarrier spacing for random access preambles of a random access procedure and time-frequency resources comprising random access channel occasions for transmission of the random access preambles, wherein the time-frequency resources are based at least in part on the subcarrier spacing for the random access preambles; broadcasting the random access configuration; and receiving a random access preamble, the random access preamble indicating a random access radio network temporary identifier that is based at least in part on the time-frequency resources and a slot index for a slot in which the random access preamble is received.

Aspect 26: The method of aspect 25, wherein the time-frequency resources comprising the random access channel occasions comprise a periodicity of slots comprising the random access channel occasions, wherein determining the random access radio network temporary identifier is based at least in part on the periodicity of slots and the slot index.

Aspect 27: The method of any of aspects 25 through 26, wherein a periodicity of slots comprising the random access channel occasions is based at least in part on the random access channel occasions being allocated every N slots for the subcarrier spacing, N is a positive integer greater than 1, and the subcarrier spacing comprises a N*120 kilohertz subcarrier spacing, and a range of the slot index of the random access radio network temporary identifier ranges from zero to a value determined based at least in part on a floor operation, the floor operation performed on a ratio of the slot index to N.

Aspect 28: The method of any of aspects 25 through 27, further comprising: configuring the random access configuration to indicate a normal uplink carrier and a supplementary uplink carrier, wherein the random access configuration is broadcasted on the normal uplink carrier or the supplementary uplink carrier, or both, and wherein the random access preamble is received on the normal uplink carrier or the supplementary uplink carrier, wherein the random access radio network temporary identifier is based at least in part on the normal uplink carrier or the supplementary uplink carrier.

Aspect 29: The method of any of aspects 25 through 28, further comprising: configuring the random access configuration to indicate a predetermined value used to shift bit values for the random access radio network temporary identifier to follow a set of one or more additional radio network temporary identifiers different from the random access radio network temporary identifier, and wherein the random access radio network temporary identifier is based at least in part on the random access configuration, the predetermined value being added, and a slot index for a slot in which the random access preamble is received.

Aspect 30: The method of any of aspects 25 through 29, further comprising: configuring the random access configuration to indicate resources for a random access preamble, and wherein the random access radio network temporary identifier is based at least in part on the random access configuration and an ordinal number associated with a random access channel occasion of a random access response window corresponding to the indicated resources.

Aspect 31: An apparatus for wireless communications at a UE, comprising: a processor; memory coupled with the processor; and instructions stored in the memory and executable by the processor to cause the apparatus to perform a method of any of aspects 1 through 6.

Aspect 32: An apparatus for wireless communications at a UE, comprising at least one means for performing a method of any of aspects 1 through 6.

Aspect 33: A non-transitory computer-readable medium storing code for wireless communications at a UE, the code comprising instructions executable by a processor to perform a method of any of aspects 1 through 6.

Aspect 34: An apparatus for wireless communications at a base station, comprising a processor; memory coupled with the processor; and instructions stored in the memory and executable by the processor to cause the apparatus to perform a method of any of aspects 7 through 12.

Aspect 35: An apparatus for wireless communications at a base station, comprising at least one means for performing a method of any of aspects 7 through 12.

Aspect 36: A non-transitory computer-readable medium storing code for wireless communications at a base station, the code comprising instructions executable by a processor to perform a method of any of aspects 7 through 12.

Aspect 37: An apparatus for wireless communications at a UE, comprising a processor; memory coupled with the processor; and instructions stored in the memory and executable by the processor to cause the apparatus to perform a method of any of aspects 13 through 24.

Aspect 38: An apparatus for wireless communications at a UE, comprising at least one means for performing a method of any of aspects 13 through 24.

Aspect 39: A non-transitory computer-readable medium storing code for wireless communications at a UE, the code comprising instructions executable by a processor to perform a method of any of aspects 13 through 24.

Aspect 40: An apparatus for wireless communications at a base station, comprising a processor; memory coupled with the processor; and instructions stored in the memory and executable by the processor to cause the apparatus to perform a method of any of aspects 25 through 30.

Aspect 41: An apparatus for wireless communications at a base station, comprising at least one means for performing a method of any of aspects 25 through 30.

Aspect 42: A non-transitory computer-readable medium storing code for wireless communications at a base station, the code comprising instructions executable by a processor to perform a method of any of aspects 25 through 30.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS).

LTE, LTE-A, and LTE-A Pro are releases of UMTS that use E-UTRA. UTRA, E-U IRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a random access configuration for the UE, the random access configuration indicating resources for the UE to use to transmit a random access preamble and indicating a random access response window;
   determining a random access radio network temporary identifier based at least in part on the indicated resources;
   transmitting, using the indicated resources, the random access preamble indicating the determined random access radio network temporary identifier; and
   receiving a downlink control information based at least in part on transmitting the random access preamble, the downlink control information indicating a segment of the random access response window corresponding to the random access radio network temporary identifier, wherein the downlink control information indicates a positive integer quantity of bits that indicate the segment.

2. The method of claim 1, wherein the random access response window includes at least a 10 millisecond window, and wherein each segment is less than 10 milliseconds.

3. The method of claim 1, further comprising:
   determining, based at least in part on a subcarrier spacing for the random access preamble, the quantity of the bits that indicate the segment.

4. The method of claim 1, further comprising:
   determining, based at least in part on the downlink control information, second resources corresponding to the segment for the UE to use to receive a random access response message in the segment; and
   receiving the random access response message on the resources of the segment.

5. The method of claim 1, wherein a duration of the segment is less than a duration of a system frame.

6. A method for wireless communications at a base station, comprising:
   configuring a random access configuration to indicate resources for a random access preamble and to indicate a random access response window;
   broadcasting the random access configuration;
   receiving a random access preamble, the random access preamble indicating a random access radio network temporary identifier that is based at least in part on the random access configuration and on the indicated resources; and
   transmitting a downlink control information based at least in part on receiving the random access preamble, the downlink control information indicating a segment of the random access response window corresponding to the random access radio network temporary identifier, wherein the downlink control information indicates a positive integer quantity of bits that indicate the segment.

7. The method of claim 6, wherein the random access response window includes at least a 10 millisecond window, and wherein each segment is less than 10 milliseconds.

8. The method of claim 6, further comprising:
   configuring, based at least in part on a subcarrier spacing for the random access preamble, the quantity of the bits to indicate the segment.

9. The method of claim 6, further comprising:
   configuring the downlink control information to include second resources corresponding to the segment for a UE to use to receive a random access response message in the segment; and
   transmitting the random access response message on the resources of the segment.

10. The method of claim 9, wherein a duration of the segment is less than a duration of a system frame.

11. A method for wireless communications at a user equipment (UE), comprising:
    receiving a random access configuration for the UE, the random access configuration indicating a subcarrier spacing for random access preambles of a random access procedure and time-frequency resources comprising random access channel occasions for transmission of the random access preambles, wherein the time-frequency resources are based at least in part on the subcarrier spacing for the random access preambles;
    determining a random access radio network temporary identifier based at least in part on the time-frequency resources and a slot index for a slot in which the UE is to transmit a random access preamble, wherein the slot index is associated with the subcarrier spacing, wherein the subcarrier spacing is of a plurality of subcarrier spacings and corresponds to a first frequency; and
    transmitting, in the slot, the random access preamble indicating the determined random access radio network temporary identifier.

12. The method of claim 11, wherein the time-frequency resources comprising the random access channel occasions comprise:
    a periodicity of slots comprising the random access channel occasions, wherein determining the random access radio network temporary identifier is based at least in part on the periodicity of slots and the slot index.

13. The method of claim 11, wherein a periodicity of slots comprising the random access channel occasions is based at least in part on the random access channel occasions being allocated every N slots for the subcarrier spacing, wherein N is a positive integer greater than 1.

14. The method of claim 13, wherein the subcarrier spacing comprises a N*120 kilohertz subcarrier spacing, and wherein a range of the slot index of the random access radio network temporary identifier ranges from zero to a value determined based at least in part on a floor operation, wherein the floor operation performed on a ratio of the slot index to N.

15. The method of claim 11, wherein the time-frequency resources comprising the random access channel occasions comprise:
   a time resource for transmission of a random access preamble in the random access channel occasions, wherein determining the random access radio network temporary identifier is based at least in part on the time resource and performing a modulo operation that is based at least in part on the indicated subcarrier spacing for the random access preambles.

16. The method of claim 11, further comprising:
   determining that the random access radio network temporary identifier collides with a previously determined random access radio network temporary identifier, or collides with a reserved value from a reserved range of values, or collides with a pre-allocated random access radio network temporary identifier; and
   marking the random access radio network temporary identifier as invalid based at least in part on determining that the random access radio network temporary identifier collides with the previously determined random access radio network temporary identifier, the reserved value from the reserved range of values, or the pre-allocated random access radio network temporary identifier.

17. The method of claim 16, wherein the pre-allocated random access radio network temporary identifier includes a paging random access radio network temporary identifier or a system information random access radio network temporary identifier.

18. The method of claim 11, wherein a slot index ranges from zero to N*80 for a subcarrier spacing of N*120 kilohertz and a random access response window is M milliseconds, wherein N is a positive integer greater than 1 and M is a positive integer that ranges from 1 to 40.

19. The method of claim 11, wherein the time-frequency resources comprising the random access channel occasions comprise:
   at least one of a periodicity of slots comprising the random access channel occasions for transmission for the random access preambles or a limit of frequency domain random access channel occasions, wherein determining the random access radio network temporary identifier is based at least in part on the at least one of the periodicity of slots or the limit of frequency domain random access channel occasions,
   wherein a quantity of frequency domain random access channel occasions is 1 or 2 when the subcarrier spacing is 960 kilohertz and an uplink carrier identifier is set to 1, or wherein a quantity of frequency domain random access channel occasions is between zero and 4 when the subcarrier spacing is 960 kilohertz and an uplink carrier identifier is set to 1, or the uplink carrier identifier is set to zero and a periodicity of slots comprising the random access channel occasions is set to every other slot.

20. The method of claim 11, wherein the random access configuration indicates an extension of the slot index based at least in part on the subcarrier spacing for the random access preambles.

21. The method of claim 11, wherein a quantity of frequency domain random access channel occasions is between zero and 4, and a quantity of time domain random access channel occasions by allocating the random access channel occasions every other slot when the quantity of frequency domain random access channel occasions is between zero and 4, and wherein a slot index ranges from zero to 320 when the quantity of frequency domain random access channel occasions are between zero and 4 and an uplink carrier identifier is set to 1.

22. The method of claim 11, wherein a quantity of frequency domain random access channel occasions is between zero and 4 when an uplink carrier identifier is set to zero, wherein a slot index ranges from zero to 640 when the quantity of frequency domain random access channel occasions are limited between zero and 4 and the uplink carrier identifier is set to zero, and wherein the quantity of frequency domain random access channel occasions are between zero and 4 when the subcarrier spacing is 960 kilohertz and the uplink carrier identifier is set to zero.

23. A method for wireless communications at a base station, comprising:
   configuring a random access configuration for a UE, the random access configuration indicating a subcarrier spacing for random access preambles of a random access procedure and time-frequency resources comprising random access channel occasions for transmission of the random access preambles, wherein the time-frequency resources are based at least in part on the subcarrier spacing for the random access preambles;
   broadcasting the random access configuration; and
   receiving a random access preamble, the random access preamble indicating a random access radio network temporary identifier that is based at least in part on the time-frequency resources and a slot index for a slot in which the random access preamble is received, wherein the slot index is associated with the subcarrier spacing, wherein the subcarrier spacing is of a plurality of subcarrier spacings and corresponds to a first frequency.

24. The method of claim 23, wherein the time-frequency resources comprising the random access channel occasions comprise:
   a periodicity of slots comprising the random access channel occasions, wherein determining the random access radio network temporary identifier is based at least in part on the periodicity of slots and the slot index.

25. The method of claim 23, wherein a periodicity of slots comprising the random access channel occasions is based at least in part on the random access channel occasions being allocated every N slots for the subcarrier spacing, wherein N is a positive integer greater than 1, and wherein the subcarrier spacing comprises a N*120 kilohertz subcarrier spacing, and wherein a range of the slot index of the random access radio network temporary identifier ranges from zero to a value determined based at least in part on a floor operation, wherein the floor operation performed on a ratio of the slot index to N.

26. The method of claim 23, further comprising:
   configuring the random access configuration to indicate a normal uplink carrier and a supplementary uplink carrier, wherein the random access configuration is broadcasted on the normal uplink carrier or the supplementary uplink carrier, or both, and
   wherein the random access preamble is received on the normal uplink carrier or the supplementary uplink carrier, wherein the random access radio network temporary identifier is based at least in part on the normal uplink carrier or the supplementary uplink carrier.

27. The method of claim 23, further comprising:
   configuring the random access configuration to indicate a predetermined value used to shift bit values for the random access radio network temporary identifier to follow a set of one or more additional radio network temporary identifiers different from the random access radio network temporary identifier, and wherein the random access radio network temporary identifier is based at least in part on the random access configuration, the predetermined value being added, and a slot index for a slot in which the random access preamble is received.

28. The method of claim 23, further comprising:

configuring the random access configuration to indicate resources for a random access preamble, and wherein the random access radio network temporary identifier is based at least in part on the random access configuration and an ordinal value associated with a random access channel occasion of a random access response window corresponding to the indicated resources.

29. The method of claim 11, wherein the slot index ranges from zero to N*80 and the subcarrier spacing comprises a subcarrier spacing of N*120 kilohertz, wherein N is a positive integer greater than 1.

30. The method of claim 23, wherein the slot index ranges from zero to N*80 and the subcarrier spacing comprises a subcarrier spacing of N*120 kilohertz, wherein N is a positive integer greater than 1.

* * * * *